United States Patent
Koumura et al.

(10) Patent No.: US 7,949,446 B2
(45) Date of Patent: May 24, 2011

(54) BODY-ROLL RESTRAINING SYSTEM FOR VEHICLE

(75) Inventors: Shingo Koumura, Susono (JP); Jin Hozumi, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/677,232

(22) PCT Filed: Sep. 22, 2008

(86) PCT No.: PCT/JP2008/067077
§ 371 (c)(1),
(2), (4) Date: Mar. 9, 2010

(87) PCT Pub. No.: WO2009/050983
PCT Pub. Date: Apr. 23, 2009

(65) Prior Publication Data
US 2010/0324780 A1  Dec. 23, 2010

(30) Foreign Application Priority Data
Oct. 17, 2007 (JP) ................................. 2007-270568

(51) Int. Cl.
*G06F 19/00* (2006.01)
(52) U.S. Cl. ........................................................ 701/38
(58) Field of Classification Search .............. 701/36–38; 280/5.5, 5.505, 5.507, 5.512, 5.515, 124.104, 280/124.1
See application file for complete search history.

(56) References Cited

U.S. PATENT DOCUMENTS

| | | | | |
|---|---|---|---|---|
| 5,269,557 A | * | 12/1993 | Butsuen et al. | 280/5.515 |
| 6,702,265 B1 | * | 3/2004 | Zapletal | 267/187 |
| 2007/0150144 A1 | | 6/2007 | Yasui | |
| 2008/0119984 A1 | * | 5/2008 | Hrovat et al. | 701/38 |

FOREIGN PATENT DOCUMENTS

| | | |
|---|---|---|
| JP | A-7-228114 | 8/1995 |
| JP | A-2005-238971 | 9/2005 |
| JP | A-2006-256459 | 9/2006 |
| JP | A-2006-321296 | 11/2006 |

OTHER PUBLICATIONS

International Search Report mailed on Dec. 16, 2008 in corresponding International Application No. PCT/JP2008/067077 (with translation).

* cited by examiner

*Primary Examiner* — Yonel Beaulieu
(74) *Attorney, Agent, or Firm* — Oliff & Berridge, PLC

(57) ABSTRACT

A body-roll restraining system with high utility equipped with active stabilizer devices on a front-wheel side and a rear-wheel side of the vehicle and configured to generate roll restraining forces whose directions are opposite to each other, and maybe configured such that the roll restraining forces are changeable owing to an operation of an actuator, The system having a road-surface-unevenness-dependent-roll restraining control. The above-indicated road-surface-unevenness-dependent-roll restraining control is executable in addition to a control which was conducted in conventional stabilizer devices to restrain the roll that arises from turning of the vehicle, and thus the ride comfort of the vehicle is enhanced.

14 Claims, 14 Drawing Sheets

FIG.9

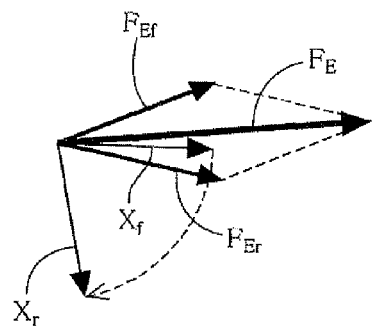

(a)

VEHICLE SPEED 90km/h
 $\alpha_{Cf}$: FRONT-WHEEL-SIDE DAMPER GAIN →SMALL
 $\alpha_{Cr}$: REAR-WHEEL-SIDE DAMPER GAIN →LARGE
 $\alpha_{Kf}$: FRONT-WHEEL-SIDE SPRING GAIN →LARGE
 $\alpha_{Kr}$: REAR-WHEEL-SIDE SPRING GAIN →SMALL

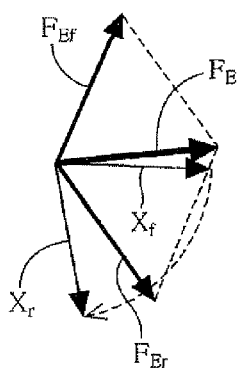

(b)

VEHICLE SPEED 90km/h
 $\alpha_{Cf}$: FRONT-WHEEL-SIDE DAMPER GAIN →LARGE
 $\alpha_{Cr}$: REAR-WHEEL-SIDE DAMPER GAIN →SMALL
 $\alpha_{Kf}$: FRONT-WHEEL-SIDE SPRING GAIN →SMALL
 $\alpha_{Kr}$: REAR-WHEEL-SIDE SPRING GAIN →LARGE

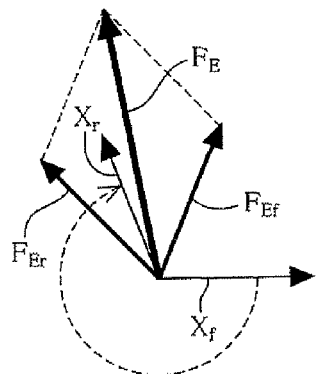

(c)

VEHICLE SPEED 30km/h
 $\alpha_{Cf}$: FRONT-WHEEL-SIDE DAMPER GAIN →LARGE
 $\alpha_{Cr}$: REAR-WHEEL-SIDE DAMPER GAIN →SMALL
 $\alpha_{Kf}$: FRONT-WHEEL-SIDE SPRING GAIN →SMALL
 $\alpha_{Kr}$: REAR-WHEEL-SIDE SPRING GAIN →LARGE

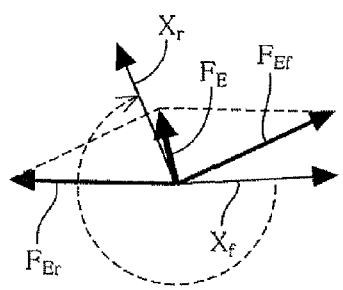

(d)

VEHICLE SPEED 30km/h
 $\alpha_{Cf}$: FRONT-WHEEL-SIDE DAMPER GAIN →SMALL
 $\alpha_{Cr}$: REAR-WHEEL-SIDE DAMPER GAIN →LARGE
 $\alpha_{Kf}$: FRONT-WHEEL-SIDE SPRING GAIN →LARGE
 $\alpha_{Kr}$: REAR-WHEEL-SIDE SPRING GAIN →SMALL

BODY-ROLL RESTRAINING SYSTEM FOR VEHICLE

TECHNICAL FIELD

The present invention relates to a body-roll restraining system installed on a vehicle, and more particularly to such a body-roll restraining system in which there is executable a control for restraining roll of a body of the vehicle which arises from unevenness of a road surface on which the vehicle travels.

BACKGROUND ART

In recent years, there has been developed, in the field of automotive vehicles, a body-roll restraining system disclosed in the following patent documents, namely, a system equipped with a roll restraining device which is configured to generate a roll restraining force for restraining or suppressing roll of the vehicle body and which is configured such that the roll restraining force is changeable owing to an operation of an actuator. Such a system is called an active stabilizer system or the like and has been actually mounted on some of vehicles.

The body-roll restraining systems that have been developed so far aim at restraining roll of the vehicle body that arises mainly from turning of the vehicle and is configured to estimate roll moment that the vehicle body undergoes due to the turning of the vehicle and to generate an appropriate roll restraining force on the basis of the estimated roll moment, for effectively restraining the roll of the vehicle body.

| Patent Document 1 | JP-A-2006-321296 |
| Patent Document 2 | JP-A-2006-256459 |

DISCLOSURE OF THE INVENTION

(A) Summary of the Invention

The roll of the vehicle body is not necessarily caused only by the turning of the vehicle. Where the vehicle runs straight on road surfaces such as a rough road surface, an uneven or irregular road surface, and a stepped road surface, for instance, the roll is caused due to the unevenness of such road surfaces. The body-roll restraining systems that have been developed so far are not configured to restrain such roll arising from the unevenness of the road surface. Accordingly, the utility of the body-roll restraining system can be improved by effectively coping with such roll of the vehicle body. The present invention has been developed in the light of the situations described above, and it is therefore an object of the invention to provide a body-roll restraining system for a vehicle with high utility.

To achieve the object indicated above, the present invention provides a body-roll restraining system for restraining roll of a body of a vehicle equipped with front-wheel-side suspension devices respectively provided for left and right wheels on a front side of the vehicle and rear-wheel-side suspension devices respectively provided for left and right wheels on a rear side of the vehicle, each of the suspension devices including (a) a suspension spring for elastically connecting a sprung portion and an unsprung portion and (b) a damper for generating a damping force with respect to a relative movement of the sprung portion and the unsprung portion, the system comprising:

a front-wheel-side roll restraining device and a rear-wheel-side roll restraining device each of which is configured to generate a roll restraining force that functions as a force by which the sprung portion and the unspring portion corresponding to one of the left and right wheels approach toward each other while the sprung portion and the unspring portion corresponding to the other of the left and right wheels are separated away from each other, each of which has an actuator, and each of which is configured such that the roll restraining force is changeable owing to an operation of the actuator; and a controller which is configured to determine a target device-individualized roll restraining force that is the roll restraining force to be generated by each of the front-wheel-side roll restraining device and the rear-wheel-side roll restraining device and which is configured to control the operation of the actuator of said each of the front-wheel-side roll restraining device and the rear-wheel-side roll restraining device on the basis of the determined target device-individualized roll restraining force, wherein the controller includes a road-surface-unevenness-dependent-roll-restraining-force determining portion configured to determine a target road-surface-unevenness-dependent-roll restraining force that is the roll restraining force to be generated by both of the front-wheel-side roll restraining device and the rear-wheel-side roll restraining device, for restraining the roll of the body of the vehicle that arises from unevenness of a road surface on which the vehicle travels, wherein the road-surface-unevenness-dependent-roll-restraining-force determining portion is configured to determine the target road-surface-unevenness-dependent-roll restraining force according to a virtual roll behavior model set for restraining the roll of the body of the vehicle that arises from the unevenness of the road surface on which the vehicle travels, wherein the road-surface-unevenness-dependent-roll-restraining-force determining portion includes a roll-causing-force-reduction-type roll-restraining-force determining portion which employs a roll-causing-force reduction model as the roll behavior model for reducing a roll-causing force as a force to be generated by the suspension spring and the damper of each of the suspension devices and as a force that causes the roll of the body of the vehicle resulting from a relative displacement movement of the unsprung portions for the left and right wheels on the front side of the vehicle and a relative displacement movement of the unsprung portions for the left and right wheels on the rear side of the vehicle, the roll-causing-force-reduction-type roll-restraining-force determining portion configured to estimate, according to the roll-causing-force reduction model, a reduction force that is a difference between the roll-causing force to be actually generated by the suspension spring and the damper and the reduced roll-causing force and configured to determine the target road-surface-unevenness-dependent-roll restraining force on the basis of the estimation, wherein the roll-causing force contains components thereof: a front-wheel-side-spring-dependent roll-causing force generated by front-wheel-side springs that are the two suspension springs of the front-wheel-side suspension devices; a front-wheel-side-damper-dependent roll-causing force generated by front-wheel-side dampers that are the two dampers of the front-wheel-side suspension devices; a rear-wheel-side-spring-dependent roll-causing force generated by rear-wheel-side springs that are the two suspension springs of the rear-wheel-side suspension devices; and a rear-wheel-side-damper-dependent roll-causing force generated by rearwheel-side dampers that are the two dampers of the rear-wheel-side suspension devices, and wherein the roll-causing-force reduction model is set so as to reduce at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force, on the basis of a reduction ratio set for each of the at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force.

In the body-roll restraining system according to the present invention, the roll of the vehicle body that arises from the unevenness of the road surface is effectively restrained by the roll restraining devices described above, thereby improving the ride comfort of the vehicle as felt by vehicle passengers. In this respect, the body-roll restraining system according to the present invention offers high utility.

(B) Forms of Invention

There will be explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention.

(1) A body-roll restraining system for restraining roll of a body of a vehicle equipped with front-wheel-side suspension devices respectively provided for left and right wheels on a front side of the vehicle and rear-wheel-side suspension devices respectively provided for left and right wheels on a rear side of the vehicle, each of the suspension devices including (a) a suspension spring for elastically connecting a sprung portion and an unsprung portion and (b) a damper for generating a damping force with respect to a relative movement of the sprung portion and the unsprung portion, the system comprising:

a front-wheel-side roll restraining device and a rear-wheel-side roll restraining device each of which is configured to generate a roll restraining force that functions as a force by which the sprung portion and the unspring portion corresponding to one of the left and right wheels approach toward each other while the sprung portion and the unspring portion corresponding to the other of the left and right wheels are separated away from each other, each of which has an actuator, and each of which is configured such that the roll restraining force is changeable owing to an operation of the actuator; and a controller which is configured to determine a target device-individualized roll restraining force that is the roll restraining force to be generated by each of the front-wheel-side roll restraining device and the rear-wheel-side roll restraining device and which is configured to control the operation of the actuator of said each of the front-wheel-side roll restraining device and the rear-wheel-side roll restraining device on the basis of the determined target device-individualized roll restraining force, wherein the controller includes a road-surface-unevenness-dependent-roll-restraining-force determining portion configured to determine a target road-surface-unevenness-dependent-roll restraining force that is the roll restraining force to be generated by both of the front-wheel-side roll restraining device and the rear-wheel-side roll restraining device, for restraining the roll of the body of the vehicle that arises from unevenness of a road surface on which the vehicle travels.

Briefly, in the body-roll restraining system according to this form, there is executable a control in which the force to be generated by each of the front-wheel-side and the rear-wheel-side roll restraining devices is applied as a force for restraining roll of the vehicle body that is caused by unevenness of the road surface on which the vehicle travels (hereinafter referred to as "road-surface-unevenness-dependent roll" where appropriate), namely, there is executable a "road-surface-unevenness-dependent-roll restraining control". In conventional body-roll restraining systems that have been developed so far, there is mainly executed a control for restraining roll of the vehicle body that is caused by turning or cornering of the vehicle (hereinafter referred to as "vehicle-turning-dependent roll" where appropriate), namely, there is executed a "vehicle-turning-dependent-roll restraining control". In this regard, this form is unique in that the road-surface-unevenness-dependent-roll restraining control is executable. According to this form, the road-surface-unevenness-dependent roll can be effectively restrained or suppressed, whereby the ride comfort of the vehicle can be improved. In the specification, "the roll of the vehicle body" does not mean roll of the vehicle body with respect to the left and right unsprung portions, i.e., relative roll, but means roll of the vehicle body with respect to the horizontal state of the vehicle body, i.e., absolute roll, unless otherwise specified.

The structure of the "roll restraining device" in this form is not particularly limited, but it is possible to employ a so-called active stabilizer device, for instance. The stabilizer device is configured to apply, by a stabilizer bar thereof, forces having the same magnitude and having mutually opposite directions, between the sprung portion and the unsprung portion on the right side and between the sprung portion and the unsprung portion on the left side. The active stabilizer device is configured to positively change the forces by an actuator. The structure of the active stabilizer device will be explained in detail. Each roll restraining device in this form may be equipped with actuators which are disposed on the left side and the right side, respectively and which can be controlled independently of each other. In this instance, the roll restraining device may be configured to generate the roll restraining force by controlling the actuators in a coordinated fashion.

The "actuator" of each roll restraining device may be constituted principally by an electric motor. Alternatively, the actuator may be configured to operate by a hydraulic pressure such as an oil pressure. As the "controller", it may be possible to employ the one constituted mainly by a computer, for instance. In general, the actuator is driven under control of the controller by a drive device in accordance with the kind of the actuator. In this instance, the controller may include the drive device as its constituent element. Alternatively, the controller may be configured to drive the drive device disposed outside thereof.

The controller is configured to determine target roll restraining forces individually for the front-wheel-side and the rear-wheel-side roll restraining devices and to control the roll restraining devices independently of each other. The controller includes the "road-surface-unevenness dependent-roll-restraining-force determining portion" as a main functional portion to execute the road-surface-unevenness-dependent-roll restraining control and has a function of determining the "target device-individualized roll restraining force" of each of the front-wheel-side and the rear-wheel-side roll restraining devices, on the basis of the above-described "target road-surface-unevenness-dependent-roll restraining force" determined by the determining portion. The target road-surface-unevenness-dependent-roll restraining force may be determined as each of the respective roll restraining forces to be generated by the respective front-wheel-side and rear-wheel-side roll restraining devices or may be determined as a sum of the roll restraining forces to be generated by the respective front-wheel-side and rear-wheel-side roll restraining devices, in the road-surface-unevenness-dependent-roll restraining control.

(2) The body-roll restraining system according to the form (1), wherein the controller further includes a roll-restraining-force distributing portion configured to distribute the target road-surface-unevenness-dependent-roll restraining force determined by the road-surface-unevenness-dependent-roll-restraining-force determining portion into the target device-individualized roll restraining force for the front-wheel-side roll restraining device and the target device-individualized roll restraining force for the rear-wheel-side roll restraining device, on the basis of a distribution ratio.

This form is particularly effective in an instance where the target road-surface-unevenness dependent-roll-restraining-force determining portion is configured to determine the sum of the roll restraining forces to be generated by the respective front-wheel-side and rear-wheel-side roll restraining devices. In general, the roll stiffness distribution of the front-wheel side and the rear-wheel side is set such that the vehicle is under the tendency of understeer upon turning. The "distribution ratio" in this form may be determined according to the thus set roll stiffness distribution, for instance. The value of the distribution ratio may be fixed so as not to be changed or may be variable so as to be changed depending upon certain situations and conditions. In this respect, since the vehicle body can be regarded as a rigid body, the body-roll restraining effect is not largely influenced even if the distribution ratio is changed.

(3) The body-roll restraining system according to the form (2), wherein the roll-restraining-force distributing portion is configured to change the distribution ratio on the basis of a load on each of the front-wheel-side roll restraining device and the rear-wheel-side roll restraining device.

According to this form, it is possible to suppress or avoid an excessive load on each roll restraining device. More specifically, the roll-restraining-force distributing portion is configured such that, where the load on one of the two roll restraining devices is large, the distribution ratio is changed so as to permit the other of the two roll restraining devices to bear the load that the one of the two roll restraining devices should bear, for instance. Further, a load index indicative of the load on each roll restraining device is set, for instance. Where the value of the load index of one of the two roll restraining devices is expected to exceed a threshold, the distribution ratio may be changed such that the roll restraining force to be generated by the one of the two roll restraining devices is made small and such that the roll restraining force to be generated by the other of the two roll restraining devices is made large. Moreover, the distribution ratio may be changed such that the load indices of the respective two roll restraining devices are made equal to each other. As the load index of each roll restraining device, it may be possible to employ the roll restraining force per se to be generated by each roll restraining device, for instance. Where the actuator of the roll restraining device has the electric motor as a drive source, the power, the current, and so on to be supplied to the electric motor may be employed as the load index.

(4) The body-roll restraining system according to any one of the forms (1)-(3), wherein the controller further includes a vehicle-turning-dependent-roll-restraining-force determining portion configured to determine a target vehicle-turning-dependent-roll restraining force that is the roll restraining force to be generated by both of the front-wheel-side roll restraining device and the rear-wheel-side roll restraining device, for restraining the roll of the body of the vehicle that arises from turning of the vehicle.

According to this form, it is possible to realize the function that the conventional body-roll restraining systems have, namely, the function of restraining the vehicle-turning-dependent roll. In this form, both of the vehicle-turning-dependent-roll restraining control and the road-surface-unevenness-dependent-roll restraining control are executable, and both of the vehicle-turning-dependent roll and the road-surface-unevenness-dependent roll can be restrained. Accordingly, the vehicle on which the system according to this form is mounted ensures good ride comfort. While the above-described two controls may be selectively executed, it is desirable that the two controls be executed concurrently in terms of good ride comfort. In other words, it is desirable that the vehicle-turning-dependent-roll-restraining-force determining portion and the road-surface-unevenness-dependent-roll-restraining-force determining portion work together with each other. Where the two controls are executed concurrently, the target device-individualized roll restraining force of each of the front-wheel-side and rear-wheel-side roll restraining devices may be determined on the basis of a sum of the target vehicle-turning-dependent-roll restraining force determined by the vehicle-turning-dependent-roll-restraining-force determining portion and the target road-surface-unevenness-dependent-roll restraining force determined by the road-surface-unevenness-dependent-roll-restraining-force determining portion. Like the target road-surface-unevenness-dependent-roll restraining force, the target vehicle-turning-dependent-roll restraining force determined by the vehicle-turning-dependent-roll-restraining-force determining portion may be determined as each of the respective roll restraining forces to be generated by the respective front-wheel-side and rear-wheel-side roll restraining devices or may be determined as a sum of the roll restraining forces to be generated by the those devices, in the vehicle-turning-dependent-roll restraining control.

(5) The body-roll restraining system according to form (4), wherein the controller further includes a roll-restraining-force distributing portion for distributing the target road-surface-unevenness-dependent-roll restraining force determined by the road-surface-unevenness-dependent-roll-restraining-force determining portion into the target device-individualized roll restraining force for the front-wheel-side roll restraining device and the target device-individualized roll restraining force for the rear-wheel-side roll restraining device, on the basis of a distribution ratio, and wherein the roll-restraining-force distributing portion is configured to distribute a total force of the target road-surface-unevenness-dependent-roll restraining force determined by the road-surface-unevenness-dependent-roll-restraining-force determining portion and the target vehicle-turning-dependent-roll restraining force determined by the vehicle-turning-dependent-roll-restraining-force determining portion, into the target device-individualized roll restraining force for the front-wheel-side roll restraining device and the target device-individualized roll restraining force for the rear-wheel-side roll restraining device, on the basis of the distribution ratio.

This form is preferable in the form in which the vehicle-turning-dependent-roll restraining control and the road-surface-unevenness-dependent-roll restraining control are concurrently executable.

(6) The body-roll restraining system according to the form (4) or (5), wherein the vehicle-turning-dependent-roll-restraining-force determining portion is configured to determine the target vehicle-turning-dependent-roll restraining force on the basis of a value of a vehicle-turning-dependent roll-moment index indicative of roll moment that acts on the body of the vehicle arising from the turning of the vehicle In this form, a limitation relating to a concrete technique of the vehicle-turning-dependent-roll restraining control is added. By determining the target vehicle-turning-dependent-roll restraining force on the basis of the value of the above-described "vehicle-turning-dependent roll-moment index", the vehicle-turning-dependent roll can be effectively restrained.

(7) The body-roll restraining system according to the form (6), wherein the vehicle-turning-dependent-roll-restraining-force determining portion is configured to determine the target vehicle-turning-dependent-roll restraining force on the basis of at least one of a value of lateral acceleration of the vehicle, a value of a yaw rate of the vehicle, a value of a running speed of the vehicle, and a value of a steering amount of the vehicle, each as the vehicle-turning-dependent roll-moment index value.

In this form, the above-indicated vehicle-turning-dependent roll-moment index is concretely limited. The vehicle-turning-dependent roll-moment indices listed above can be detected comparatively simply and permit comparatively simple estimation of the roll moment due to turning of the vehicle.

(8) The body-roll restraining system according to any one of the forms (1)-(7), wherein the road-surface-unevenness-dependent-roll-restraining-force determining portion is configured to determine the target road-surface-unevenness-dependent-roll restraining force according to a virtual roll behavior model set for restraining the roll of the body of the vehicle that arises from the unevenness of the road surface on which the vehicle travels.

The above-described "roll behavior model" is a model for estimating the roll movement of the vehicle body and may be referred to as "roll movement model", "roll vibration model" or the like as one sort of a vibration model. Various models can be set as the roll behavior model, and a suitable model may be employed depending upon the object of the control, the running state of the vehicle, the condition of the road surface on which the vehicle runs, and so on.

To be more specific, it is possible to employ, as a basic model of the roll behavior model, a front-and-rear two-wheel model in which the vehicle body is regarded as a rigid body and which has a relative-stroke-reaction spring and a relative-stroke-reaction damper on each of the front-wheel side and the rear-wheel side. The relative-stroke-reaction spring is a virtual suspension spring which is constituted by two suspension springs on the front-wheel side or the rear-wheel side and which is configured to generate an elastic reaction force in accordance with a difference between: (a) a distance between the sprung portion and the unsprung portion on the left-wheel side; and (b) a distance between the sprung portion and the unsprung portion on the right-wheel side. This difference may be hereinafter referred to as "relative stroke amount" where appropriate. The relative-stroke-reaction damper is a virtual damper which is constituted by two dampers on the front-wheel side or the rear-wheel side and which is configured to generate a damping force in accordance with a speed of change of the difference in the distances between the sprung portion and the unsprung portion on the left-wheel side and between the sprung portion and the unsprung portion on the right-wheel side. This speed of change may be hereinafter referred to as "relative stroke speed" where appropriate). Here, the above-described relative-stroke-reaction spring has a specific spring constant (hereinafter referred to as "roll spring constant" where appropriate) with respect to the relative stroke amount while the relative-stroke-reaction damper has a specific damping coefficient (hereinafter referred to as "roll damping constant" where appropriate) with respect to the relative stroke speed.

In the road-surface-unevenness-dependent-roll restraining control, two models may be set on the basis of the above-described basic model, for instance, and the target road-surface-unevenness-dependent-roll restraining force may be determined by comparison of those models. One of the two models is a model according to an actual device structure (hereinafter referred to as "real-device model" where appropriate) in which the front-wheel side and rear-wheel side roll restraining devices are added to the basic model. The other model is a model according to an ideal control state (hereinafter referred to as "ideal-control-state model" where appropriate) in which at least one of a virtual spring and a virtual damper is added to the basic model. The virtual spring is configured to generate an elastic reaction force in accordance with the roll amount of the vehicle body for restraining the roll of the vehicle body (hereinafter referred to as "roll restraining spring" where appropriate) while the virtual damper is configured to generate a damping force in accordance with the roll speed of the vehicle body (hereinafter referred to as "roll restraining damper" where appropriate).

In the real-device model, the relative-stroke-reaction spring has a roll spring constant on the basis of the spring constants of the respective suspension springs actually installed on the vehicle while the relative-stroke-reaction damper has a roll damping coefficient on the basis of the damping coefficients of the respective dampers actually installed on the vehicle. In contrast, in the ideal-control-state model, the roll spring constant of the relative-stroke-reaction spring and the roll damping coefficient of the relative-stroke-reaction damper may be set at respective values which are different from those in the real-device model depending upon a target control state. The spring constant of the roll restraining spring (hereinafter referred to as "roll spring constant" where appropriate) and the damping coefficient of the roll restraining damper (hereinafter referred to as "roll damping coefficient" where appropriate) may be set at respective arbitrary values depending upon the target control state.

Even when the vehicle runs on the road surface with the unevenness and the unsprung portions are displaced relative to each other due to the unevenness, a state in which the roll of the vehicle body is restrained is realized by following the ideal-control-state model. Accordingly, it is possible to easily estimate, in the above-indicated real-device model, what degree of magnitude of the roll restraining force should be generated by both of the front-wheel side and rear-wheel-side roll restraining devices for realizing the state according to the ideal-control-state model. That is, in order to realize the roll state of the vehicle body according to the ideal-control-state model, the ideal-control-state model and the real-device model are compared with each other, and the roll restraining force to be generated by both of the front-wheel side and rear-wheel-side roll restraining devices in the real-device model is determined. The target road-surface-unevenness-dependent-roll restraining force is determined according to this technique, thereby enabling an appropriate road-surface-unevenness-dependent-roll restraining control.

(9) The body-roll restraining system according to the form (8), wherein the road-surface-unevenness-dependent-roll-restraining-force determining portion includes at least one of:

a skyhook-type roll-restraining-force determining portion which employs a skyhook model as the roll behavior model including at least one of a skyhook spring and a skyhook damper for restraining the roll of the body of the vehicle, which is configured to estimate, according to the skyhook model, a force to be generated by the at least one of the skyhook spring and the skyhook damper, and which is configured to determine the target road-surface-unevenness-dependent-roll restraining force on the basis of the estimated force; and a roll-causing-force-reduction-type roll-restraining-force determining portion which employs a roll-causing-force reduction model as the roll behavior model for reducing a roll-causing force as a force to be generated by the suspension spring and the damper of each of the suspension devices and as a force that causes the roll of the body of the vehicle resulting from a relative displacement movement of the unsprung portions for the left and right wheels on the front side of the vehicle and a relative displacement movement of the unsprung portions for the left and right wheels on the rear side of the vehicle, the roll-causing-force-reduction-type roll-restraining-force determining portion configured to estimate, according to the roll-causing-force reduction model, a reduction force that is a difference between the roll-causing force to be actually generated by the suspension spring and the damper and the reduced roll-causing force and configured to determine the target road-surface-unevenness-dependent-roll restraining force on the basis of the estimation.

In this form, there is added a limitation relating to the ideal-control-state model that is employed for determination of the target road-surface-unevenness-dependent-roll restraining force. The two kinds of the roll-restraining-force determining portions described above determine the target road-surface-unevenness-dependent-roll restraining force on the basis of mutually different ideal-control-state models.

The "skyhook-type roll-restraining-force determining portion" determines the target road-surface-unevenness-dependent-roll restraining force according to a specific ideal-control-state model. The specific ideal-control-state model, namely, the "skyhook model" includes at least one of the "skyhook spring" and the "skyhook damper" as at least one of the roll restraining spring and the roll restraining damper indicated above. The skyhook spring and the skyhook damper have a function of restraining the roll of the vehicle body based on the skyhook theory. Accordingly, where the force to be generated by at least one of the skyhook spring and the skyhook damper for restraining the roll of the vehicle body is determined as the target road-surface-unevenness-dependent-roll restraining force, it is possible to execute an effective road-surface-unevenness-dependent-roll restraining control. The roll spring constant of the skyhook spring and the roll damping coefficient of the skyhook damper may be set at appropriate values depending upon the target control state. The value of each of the roll spring constant and the roll damping coefficient may be a fixed value or may be a variable value that is varied depending upon the running state of the vehicle, the condition of the road surface on which the vehicle runs, and so on. The "relative displacement movement of the unspring portions for the left and right wheels" in this form is a concept that includes a relative displacement amount, a relative displacement speed, a relative displacement acceleration and the like.

In an instance where the left and right unsprung portions are displaced relative to each other due to the unevenness of the road surface, the elastic reaction force generated by the above-described relative-stroke-reaction spring and the damping force generated by the above-described relative-stroke-reaction damper act on the sprung portions, namely, act on the vehicle body, so that the vehicle body undergoes the roll by the action of the elastic reaction force and the damping force. Accordingly, the suspension spring and the damper of the suspension device generate the "roll-causing force" that causes the roll of the vehicle body. The above-indicated "roll-causing-force-reduction-type roll-restraining-force determining portion" determines the target road-surface-unevenness-dependent-roll restraining force according to the specific ideal-control-state model. In the specific ideal-control-state model, namely, in the above-indicated "roll-causing-force reduction model", at least one of the elastic reaction force and the damping force by at least one of the relative-stroke-reaction spring and the relative-stroke-reaction damper on at least one of the front-wheel side and the rear-wheel side is made smaller than at least one of those in the real-device model. By following the roll-causing-force reduction model, the roll-causing force is reduced, whereby the roll of the vehicle body is restrained. Accordingly, by determining, as the target road-surface-unevenness-dependent-roll restraining force, the roll restarting force having a magnitude corresponding to the reduced amount of the roll-causing force, namely, the roll restraining force having a magnitude corresponding to the "reduction force", it is possible to execute an effective road-surface-unevenness-dependent-roll restraining control. It is noted that a magnitude of the reduction force, in other words, a "reduction ratio" which is a ratio of the reduction force with respect to the non-reduced roll-causing force, may be set at an appropriate value depending upon the target control state. The value may be a fixed value or a variable value that is varied depending upon the running state of the vehicle, the condition of the road surface on which the vehicle travels, and so on.

(10) The body-roll restraining system according to the form (9), wherein the road-surface-unevenness-dependent-roll-restraining-force determining portion at least includes the skyhook-type roll-restraining-force determining portion.

This form is considered to be a base of the following forms having the skyhook-type roll-restraining-force determining portion, namely, the following forms in which the "skyhook-type roll restraining control" is executable.

(11) The body-roll restraining system according to the form (10), wherein the skyhook-type roll-restraining-force determining portion is configured to estimate a roll movement of the body of the vehicle according to the skyhook-type model and to estimate the force to be generated by the at least one of the skyhook spring and the skyhook damper for restraining the roll of the body of the vehicle, on the basis of the estimation of the roll movement of the body of the vehicle.

In this form, there is added a concrete limitation to a manner of determining the target road-surface-unevenness-dependent-roll restraining force in the skyhook-type roll restraining control. The "roll movement of the body of the vehicle" in this form is a concept that includes the roll amount of the vehicle body, the roll speed of the vehicle body, the roll acceleration of the vehicle body, and so on. In this regard, the roll amount of the vehicle body may be considered as the relative displacement amount of the left sprung portion and the right sprung portion, and the roll speed and the roll acceleration may be respectively considered as the speed and the acceleration of the relative displacement.

(12) The body-roll restraining system according to the form (11), wherein the skyhook-type roll-restraining-force determining portion is configured to estimate the roll movement of the body of the vehicle on the basis of at least one of: a front-wheel-side relative stroke movement that is a relative change in distances between the sprung portion and the unsprung portion for the left wheel on the front-side of the vehicle and between the sprung portion and the unsprung portion for the right wheel on the front-side of the vehicle; and a rear-wheel-side relative stroke movement that is a relative change in distances between the sprung portion and the unsprung portion for the left wheel on the rear-side of the vehicle and between the sprung portion and the unsprung portion for the right wheel on the rear-side of the vehicle.

The "relative stroke movement" in this form means a movement that causes a change in the difference between: the distance between the sprung portion and the unsprung portion on the left-wheel side; and the distance between the sprung portion and the unsprung portion on the right-wheel side. The relative stroke movement is a concept that includes the relative stroke amount, the relative stroke speed, the relative stroke acceleration, and so on. By following the skyhook model, it is easily estimate the roll movement of the vehicle body from at least one of the relative stroke movement on the front-wheel side and the relative stroke movement on the rear-wheel side.

(13) The body-roll restraining system according to the form (12), wherein the skyhook-type roll-restraining-force determining portion is configured to estimate the roll movement of the body of the vehicle on the basis of: the front-wheel-side relative stroke movement based on measured distances between the sprung portion and the unsprung portion for the left wheel on the front-side of the vehicle and between the sprung portion and the unsprung portion for the right wheels on the front-side of the vehicle; and the rear-wheel-side relative stroke movement estimated on the basis of the measured distances, a running speed of the vehicle, and a wheelbase of the vehicle.

According to this form, the roll movement of the vehicle body can be estimated by measuring the distance between the sprung portion and the unsprung portion for each of the left wheel and the right wheel on the front-wheel side (hereinafter referred to as "stroke amount" where appropriate) and the running speed of the vehicle (hereinafter referred to as "vehicle speed" where appropriate). The stroke amount the vehicle speed can be easily measured. Therefore, this form permits easy estimation of the roll movement, and accordingly easy determination of the target road-surface-unevenness-dependent-roll restraining force.

(14) The body-roll restraining system according to the form (12) or (13), wherein the controller further includes a vehicle-turning-dependent-roll-restraining-force determining portion configured to determine a target vehicle-turning-dependent-roll restraining force that is the roll restraining force to be generated by both of the front-wheel-side roll restraining device and the rear-wheel-side roll restraining device, for restraining the roll of the body of the vehicle that arises from turning of the vehicle, and wherein the skyhook-type roll-restraining-force determining portion is configured to estimate at least one of the front-wheel-side relative stroke movement and the rear-wheel-side relative stroke movement that is caused by the target vehicle-turning-dependent-roll restraining force determined by the vehicle-turning-dependent-roll-restraining-force determining portion and is configured to estimate the roll movement of the body of the vehicle on the basis of at least one of the front-wheel-side relative stroke movement and the rear-wheel-side relative stroke movement from which the estimated at least one of the front-wheel-side relative stroke movement and the rear-wheel-side relative stroke movement is excluded.

In an instance where the vehicle-turning-dependent-roll restraining control and the road-surface-unevenness-dependent-roll restraining control are executed concurrently, each roll restraining device generates respective roll restraining forces in the respective controls. Accordingly, due to the influence of the roll restraining force in the vehicle-turning-dependent-roll restraining control, it may be impossible to accurately estimate the relative stroke movement that arises from the unevenness of the road surface simply by estimation based on the measured data such as the stroke amount. According to this form, the target road-surface-unevenness-dependent-roll restraining force is determined such that the influence of the roll restraining force in the vehicle-turning-dependent-roll restraining control is excluded. Accordingly, even where the above-described two controls are executed concurrently, it is possible to execute an appropriate road-surface-unevenness-dependent-roll restraining control.

(15) The body-roll restraining system according to any one of the forms (9)-(14), wherein the road-surface-unevenness-dependent-roll-restraining-force determining portion at least includes the roll-causing-force-reduction-type roll-restraining-force determining portion.

This form is considered to be a base of the following forms having the roll-causing-force-reduction-type roll-restraining-force determining portion, namely, the following forms in which the "roll-causing-force-reduction-type roll restraining control" is executable,

(16) The body-roll restraining system according to the form (15), wherein the roll-causing-force reduction model includes at least one of a roll restraining spring configured to cause a force for restraining the roll of the body of the vehicle to act on the body of the vehicle according to an amount of the roll of the body of the vehicle and a roll restraining damper (154) configured to cause the force according to a speed of the roll of the body of the vehicle.

In this form, the roll-causing-force-reduction-type roll restraining control is executed by employing the roll-causing-force reduction model having at least one of the above-indicated roll restraining spring and the roll restraining damper. In an instance where the roll-causing force is reduced, the roll amount of the vehicle body can be reduced. However, in the roll behavior according to the model in which the roll-causing force is merely reduced, the damping of the generated roll of the vehicle body is not taken into account. The roll-causing-force reduction model employed in this form enables at least one of the above-indicated roll restraining spring and roll restraining damper to have a function of promptly damping the generated roll of the vehicle body. That is, by suitably setting the roll spring constant or the roll damping coefficient of the at least one of the above-indicated roll restraining spring and the roll restraining damper, the road-surface-unevenness-dependent roll can be more effectively restrained.

(17) The body-roll restraining system according to the form (15) or (16), wherein the roll-causing force contains components thereof: a front-wheel-side-spring-dependent roll-causing force generated by front-wheel-side springs that are the two suspension springs of the front-wheel-side suspension devices; a front-wheel-side-damper-dependent roll-causing force generated by front-wheel-side dampers that are the two dampers of the front-wheel-side suspension devices; a rear-wheel-side-spring-dependent roll-causing force generated by rear-wheel-side springs that are the two suspension springs of the rear-wheel-side suspension devices; and a rear-wheel-side-damper-dependent roll-causing force generated by rear-wheel-side dampers that are the two dampers of the rear-wheel-side suspension devices, and wherein the roll-causing-force reduction model is set so as to reduce at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force.

According to the roll-causing-force reduction model that is the front-and-rear two-wheel model explained above, the roll-causing force can be divided into the following four component forces, i.e., "front-wheel-side-spring-dependent roll-causing force" and "rear-wheel-side-spring-dependent roll-causing force" each as the component for the relative-stroke-reaction spring and "front-wheel-side-damper-dependent roll-causing force" and "rear-wheel-side-damper-dependent roll-causing force" each as the component for the relative-stroke-reaction damper. In this form, at least one of those component forces is reduced. It may be appropriately determined which one(s) of the component forces should be reduced and to what degree the at least one of the component forces is reduced, depending upon the target control state, the running state of the vehicle, the unevenness condition of the road surface, and so on.

(18) The body-roll restraining system according to the form (17), wherein the roll-causing-force reduction model is set so as to reduce at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force, on the basis of a reduction ratio set for each of the at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force.

This form employs the roll-causing-force reduction model in which at least one of the above-indicated components of the roll-causing force is reduced on the basis of the "reduction ratio". The reduction ratio can be set for each component. The reduction ratio, namely, the ratio of the reduction force of each component with respect to each component force that is not reduced, may be fixed or may be variable depending upon the running state of the vehicle, the condition of the road surface on which the vehicle runs, and so on. It is noted that the reduction ratio can be set on the basis of the standard that the reduction ratio is set at "0" where the component force is not reduced at all and that the reduction ratio is set at "1" where the component force is reduced entirely. Based on the standard, the reduction ratio of any component may be set at a negative value so as to apply the component force in the opposite direction. On the other hand, the reduction ratio may be set at a value exceeding "1" so as to increase the component force. This form includes such arrangements.

(19) The body-roll restraining system according to the form (18), wherein the roll-causing-force reduction model is set such that the front-wheel-side-spring-dependent roll-causing force coincides with a force whose magnitude depends on a front-wheel-side roll spring constant decided by spring constants of the respective front-wheel-side springs while the rear-wheel-side-spring-dependent roll-causing force coincides with a force whose magnitude depends on a rear-wheel-side roll spring constant decided by spring constants of the respective rear-wheel-side springs and such that the front-wheel-side-damper-dependent roll-causing force coincides with a force whose magnitude depends on a front-wheel-side roll damping coefficient decided by damping coefficients of the respective front-wheel-side dampers while the rear-wheel-side-damper-dependent roll-causing force coincides with a force whose magnitude depends on a rear-wheel-side roll damping coefficient decided by damping coefficients of the respective rear-wheel-side dampers, and wherein the roll-causing-force reduction model is set such that at least one of the front-wheel-side roll spring constant, the rear-wheel-side roll spring constant, the front-wheel-side roll damping coefficient, and the rear-wheel-side roll damping coefficient is reduced on the basis of the reduction ratio set for each of the at least one of the front-wheel-side-spring-dependent roll-causing force, the rear-wheel-side-spring-dependent roll-causing force, the front-wheel-side-damper-dependent roll-causing force, and the rear-wheel-side-damper-dependent roll-causing force that correspond to the front-wheel-side roll spring constant, the rear-wheel-side roll spring constant, the front-wheel-side roll damping coefficient, and the rear-wheel-side roll damping coefficient, respectively.

In this form, the roll spring constant is reduced according to the reduction ratio where the component force to be reduced is by the relative-stroke-reaction spring while the roll damping coefficient is reduced according to the reduction ratio where the component force to be reduced is by the relative-stroke-reaction damper.

(20) The body-roll restraining system according to the form (19), wherein the roll-causing-force reduction model includes at least one of a roll restraining spring configured to cause a force for restraining the roll of the body of the vehicle to act on the body of the vehicle according to an amount of the roll of the body of the vehicle and a roll restraining damper configured to cause the force according to a speed of the roll of the body of the vehicle, and wherein, where at least one of the front-wheel-side roll spring constant and the rear-wheel-side roll spring constant is reduced, the roll-causing-force reduction model at least includes the roll restraining spring having a roll spring constant that corresponds to an amount of reduction of the at least one of the front-wheel-side roll spring constant and the rear-wheel-side roll spring constant while, where at least one of the front-wheel-side roll damping coefficient and the rear-wheel-side roll damping coefficient is reduced, the roll-causing-force reduction model at least includes the roll restraining damper having a roll damping coefficient that corresponds to an amount of reduction of the at least one of the front-wheel-side roll damping coefficient and the rear-wheel-side roll damping coefficient.

Briefly, this form employs the roll-causing-force reduction model which is set such that at least one of the roll restraining spring and the roll restraining damper generates a force in accordance with the reduction force as a force for restraining the roll of the vehicle body. The roll-causing-force reduction model may be regarded as a model which is set such that a decrease in the roll damping capability due to the reduction of the roll-causing force is supplemented in accordance with the reduction force by the force of the at least one of the roll restraining spring and the roll restraining damper. In this form, the roll spring constant of the roll restraining spring and the roll damping coefficient of the roll restraining damper can be made appropriate, enabling an effective road-surface-unevenness-dependent-roll restraining control.

(21) The body-roll restraining system according to any one of the forms (18)-(20), wherein the roll-causing-force-reduction-type roll-restraining-force determining portion is configured to change, on the basis of a running speed of the vehicle, any of at least one reduction ratio each of which is set for each of the at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force.

In this form, the characteristic of the roll-causing-force-reduction-type roll restraining control is changed on the basis of the running state of the vehicle. Accordingly, this form ensures a precise roll-causing-force-reduction-type roll restraining control in accordance with the vehicle speed.

(22) The body-roll restraining system according to the form (21), wherein the roll-causing-force-reduction-type roll-restraining-force determining portion is configured to determine the reduction ratios respectively set for the front-wheel-side-spring-dependent roll-causing force and the front-wheel-side-damper-dependent roll-causing force so as to be equal to 0 and to determine the reduction ratios respectively set for the rear-wheel-side-spring-dependent roll-causing force and the rear-wheel-side-damper-dependent roll-causing force so as to be equal to 1, where the running speed of the vehicle is not higher than a prescribed threshold speed.

There exists a certain degree of time lag or delay until a time point when the roll-causing force is applied to the vehicle body by the suspension springs and the dampers after the relative displacement of the left and right unsprung portions (hereinafter simply referred to as "relative displacement of the unsprung portions" where appropriate) has been generated due to the unevenness of the road surface. This delay is hereinafter referred to as "application delay of the roll-causing force" where appropriate. Accordingly, the target road-surface-unevenness-dependent-roll restraining force determined according to the roll-causing-force reduction model is influenced by the delay. This delay becomes large as the roll-causing force is reduced. In the meantime, since the rear wheels pass on the same uneven road surface a predetermined time after the front wheels have passed thereon, the relative displacement of the rear-wheel-side unsprung portions suffers from a delay in accordance with the vehicle speed, with respect to the relative displacement of the front-wheel-side unsprung portions. This delay is hereinafter referred to as "displacement delay of the rear-wheel-side unsprung portions" where appropriate. In view of the above, it is possible to reduce the influence of the application delay of the roll-causing force in the determination of the target road-surface-unevenness-dependent-roll restraining force by employing the roll-causing-force reduction model in which the roll-causing force is not reduced on the front-wheel side but is largely reduced on the rear-wheel side instead. In short, the roll-causing-force-reduction-type roll restraining control is specialized for the rear-wheel side, thereby improving the determination accuracy of the target road-surface-unevenness-dependent-roll restraining force. In the above-described roll-causing-force reduction model in which at least one of the roll restraining spring and the roll restraining damper is employed, the force by the at least one of the roll restraining spring and the roll restraining damper can be applied to the vehicle body at a comparatively early time point after initiation of the relative displacement of the front-wheel-side left and right unsprung portions and the force by the at least one of the roll restraining spring and the roll restraining damper can be applied to the vehicle body at a time point comparatively earlier than initiation of the relative displacement of the rear-wheel-side left and right unsprung portions. The effect of improving the determination accuracy of the target road-surface-unevenness-dependent-roll restraining force is high in a situation in which the vehicle speed is low. This form takes this into consideration and suppresses deterioration in the responsiveness of the control during the low-speed running, thereby ensuring a sufficiently high degree of effect of restraining the road-surface-unevenness-dependent roll even during the low-speed running.

(23) The body-roll restraining system according to the form (21) or (22), wherein the roll-causing-force-reduction-type roll-restraining-force determining portion is configured to determine the reduction ratio set for the front-wheel-side-spring-dependent roll-causing force so as to be a value that is larger in a situation in which the running speed of the vehicle is high than in a situation in which the running speed of the vehicle is low, where the running speed of the vehicle is not lower than a prescribed threshold speed.

(24) The body-roll restraining system according to any one of the forms (21)-(23), wherein the roll-causing-force-reduction-type roll-restraining-force determining portion is configured to determine the reduction ratio set for the front-wheel-side-damper-dependent roll-causing force so as to be a value that is smaller in a situation in which the running speed of the vehicle is high than in a situation in which the running speed of the vehicle is low, where the running speed of the vehicle is not lower than a prescribed threshold speed.

(25) The body-roll restraining system according to any one of the forms (21)-(24), wherein the roll-causing-force-reduction-type roll-restraining-force determining portion is configured to determine the reduction ratio set for the rear-wheel-side-spring-dependent roll-causing force so as to be a value that is smaller in a situation in which the running speed of the vehicle is high than in a situation in which the running speed of the vehicle is low, where the running speed of the vehicle is not lower than a prescribed threshold speed.

(26) The body-roll restraining system according to any one of the forms (21)-(25), wherein the roll-causing-force-reduction-type roll-restraining-force determining portion is configured to determine the reduction ratio set for the rear-wheel-side-damper-dependent roll-causing force so as to be a value that is larger in a situation in which the running speed of the vehicle is high than in a situation in which the running speed of the vehicle is low, where the running speed of the vehicle is not lower than a prescribed threshold speed.

The roll-causing force that acts on the vehicle body can be considered as a sum of the front-wheel-side roll-causing force and the rear-wheel-side roll-causing force, and each of the roll-causing forces can be considered as a composite force of the spring-dependent roll-causing force and the damper-dependent roll-causing force. Where the relative displacement of the left and right unsprung portions is regarded as a vibration, the phase of the spring-dependent roll-causing force coincides with the phase of the relative displacement whereas the phase of the damper-dependent roll-causing force is ahead or precedes by 90° with respect to the phase of the relative displacement. In the meantime, the relative displacement of the rear-wheel-side unsprung portions is delayed with respect to the relative displacement of the front-wheel-side unsprung portions by a time obtained by dividing the vehicle speed by the wheel base (i.e., a horizontal distance between the front wheel and the rear wheel). That is, the above-described displacement delay of the rear-wheel-side unsprung portions is generated. In view of the above, the roll-causing force that acts on the vehicle body can be minimized depending upon how the four components of the roll-causing force, i.e., the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force, are reduced. The roll-causing-force-reduction-type roll restraining control aims at reducing the roll-causing force, and each of the above four forms aims at making the reduction ratio of the corresponding component of the roll-causing force appropriate while taking the above into account.

Where the roll of the vehicle body is tried to be restrained, it is desirable to consider, as a main restraining target, the relative displacement of the unsprung portions having a certain frequency, e.g., the relative displacement of the unsprung portions having a roll resonance frequency, in terms of the ride comfort of the vehicle. The frequency is preferably held in a range of 1.5-3 Hz. While varying from wheel base to wheel base, it is assumed that there is generated the displacement delay of the rear-wheel-side unsprung portions of about 270° in phase when the vehicle speed is 30 km/h and there is generated the displacement delay of the rear-wheel-side unsprung portions of about 90° in phase when the vehicle speed is 90 km/h, where it is assumed that the relative displacement of the unsprung portions has the frequency indicated above. The above four forms are desirable forms relating to the roll-causing-force-reduction-type roll restraining control based on the above assumption. According to these forms, the roll-causing force that acts on the vehicle body can be suitably reduced, thereby effectively restraining the roll of the vehicle body.

Where the reduction ratio is changed in the above four forms, the value of the reduction ratio may be gradually and steplessly changed in accordance with the vehicle speed or may be changed in steps. The prescribed threshold speeds in the respective four forms are not required to be equal to each other. The threshold speeds may be set at mutually different values independently of each other. It is noted that the threshold speeds in the respective four forms are not required to be equal to the threshold speed explained above with respect to the form that employs the roll-causing-force reduction model in which the front-wheel-side roll-causing force is not reduced. The threshold speeds may be set at mutually different values independently of each other.

(27) The body-roll restraining system according to any one of the forms (15)-(26), wherein the roll-causing-force-reduction-type roll-restraining-force determining portion is configured to estimate, according to the roll-causing-force reduction model, at least one of the relative displacement movement of the unsprung portions for the left and right wheels on the front side of the vehicle and the relative displacement movement of the unsprung portions for the left and right wheels on the rear side of the vehicle and to estimate the reduction force based on the estimation of the at least one of the relative displacement movements.

Since the roll-causing-force-reduction-type roll restraining control aims at reducing the roll-causing force due to the relative displacement of the unsprung portions, this form allows comparatively accurate estimation of the reduction force.

(28) The body-roll restraining system according to the form (27), wherein the roll-causing-force-reduction-type roll-restraining-force determining portion is configured to estimate at least one of the relative displacement movement of the unsprung portions for the left and right wheels on the front side of the vehicle and the relative displacement movement of the unsprung portions for the left and right wheels on the rear side of the vehicle, on the basis of at least one of: (i) at least one of: (i-1) a front-wheel-side relative stroke movement that is a relative change in distances between the sprung portion and the unsprung portion for the left wheel on the front-side of the vehicle and between the sprung portion and the unsprung portion for the right wheel on the front-side of the vehicle; and (i-2) a rear-wheel-side relative stroke movement that is a relative change in distances between the sprung portion and the unsprung portion for the left wheel on the rear-side of the vehicle and between the sprung portion and the unsprung portion for the right wheel on the rear-side of the vehicle: and (ii) a roll movement of the body of the vehicle.

Both of the front-wheel-side and rear-wheel-side relative stroke movements and the roll movement of the vehicle body are for suitably estimating the relative displacement movement of the unsprung portions. Accordingly, this form ensures effective execution of the roll-causing-force-reduction-type roll restraining control.

(29) The body-roll restraining system according to the form (28), wherein the roll-causing-force-reduction-type roll-restraining-force determining portion is configured to selectively conduct one of: the estimation based on the at least one of the front-wheel-side relative stroke movement and the rear-wheel-side relative stroke movement; and the estimation based on the roll movement of the body of the vehicle.

In this form, there are selectively conducted two kinds of estimation of the relative displacement movement of the unnsprung portions, which two kinds of estimation are based on respective different movements. Appropriate one of the two kinds of estimation is selected depending upon the running state of the vehicle, the condition of the road surface on which the vehicle travels, and so on.

(30) The body-roll restraining system according to the form (29), wherein the roll-causing-force-reduction-type roll-restraining-force determining portion is configured to conduct the estimation based on the at least one of the front-wheel-side relative stroke movement and the rear-wheel-side relative stroke movement where a running speed of the vehicle is higher than a prescribed threshold speed and to conduct the estimation based on the roll movement of the body of the vehicle where the running speed of the vehicle is lower than the prescribed threshold speed.

As will be explained below, in an instance where the relative displacement movements of both of the front-wheel side and rear-wheel side unsprung portions are estimated by measuring the relative stroke amount on one of the front-wheel side and the rear-wheel side, the estimation accuracy of the displacement delay of the rear-wheel-side unsprung portions is comparatively low when the vehicle speed is low. Accordingly, the estimation accuracy of the relative displacement movement of the unsprung portions on the other of the front-wheel side and the rear-wheel side becomes comparatively low. In the meantime, the estimation of the roll movement of the vehicle body is conducted by measuring the roll amount of the vehicle body, for instance. The measurement of the roll amount needs to be conducted utilizing the vertical-acceleration sensors of the sprung portions and the like, inevitably requiring cumbersome processing. In this form, the above-described two kinds of estimation of the relative displacement movement of the unnsprung portions are selectively conducted depending upon the vehicle speed while taking the advantages and the disadvantages thereof into consideration. The prescribed threshold speed in this form need not be equal to the threshold speeds explained in the other forms. That is, the prescribed threshold speed in this form can be set at differently from and independently of the threshold speeds in the other forms.

(31) The body-roll restraining system according to any one of the forms (28)-(30), wherein the roll-causing-force-reduction-type roll-restraining-force determining portion is configured to estimate the at least one of the relative displacement movement of the unsprung portions for the left and right wheels on the front side of the vehicle and the relative displacement movement of the unsprung portions for the left and right wheels on the rear side of the vehicle, on the basis of: the front-wheel-side relative stroke movement based on measured distances between the sprung portion and the unsprung portion for the left wheel on the front-side of the vehicle and between the sprung portion and the unsprung portion for the right wheels on the front-side of the vehicle; and the rear-wheel-side relative stroke movement estimated on the basis of the measured distances, a running speed of the vehicle, and a wheelbase of the vehicle, where the roll-causing-force-reduction-type roll-restraining-force determining portion conducts the estimation based on the at least one of the front-wheel-side relative stroke movement and the rear-wheel-side relative stroke movement.

In this form, a concrete method is limited as to the above-described estimation of the relative displacement movement of the unsprung portions based on the relative stroke movement.

(32) The body-roll restraining system according to any one of the forms (28)-(31), wherein the roll-causing-force-reduction-type roll-restraining-force determining portion is configured to estimate the at least one of the relative displacement movement of the unsprung portions for the left and right wheels on the front side of the vehicle and the relative displacement movement of the unsprung portions for the left and right wheels on the rear side of the vehicle, on the basis of: the roll movement of the body of the vehicle based on a measured amount of the roll of the body of the vehicle; a running speed of the vehicle; and a wheelbase of the vehicle, where the roll-causing-force-reduction-type roll-restraining-force determining portion conducts the estimation based on the roll movement of the body of the vehicle.

In this form, a concrete method is limited as to the above-described estimation of the relative displacement movement of the unsprung portions based on the roll movement of the vehicle body. As explained above, the measurement of the roll amount of the vehicle body can be conducted by arithmetic processing based on the result of detection of the acceleration of each of the left and right sprung portions, for instance.

(33) The body-roll restraining system according to any one of the forms (28)-(32), wherein the controller further includes a vehicle-turning-dependent-roll-restraining-force determining portion configured to determine a target vehicle-turning-dependent-roll restraining force that is the roll restraining force to be generated by both of the front-wheel-side roll restraining device and the rear-wheel-side roll restraining device, for restraining the roll of the body of the vehicle that arises from turning of the vehicle, and wherein the roll-causing-force-reduction-type roll-restraining-force determining portion is configured to estimate at least one of: at least one of the front-wheel-side relative stroke movement and the rear-wheel-side relative stroke movement; and the roll movement of the body of the vehicle, that is caused by the target vehicle-turning-dependent-roll restraining force determined by the vehicle-turning-dependent-roll-restraining-force determining portion, and wherein the roll-causing-force-reduction-type roll-restraining-force determining portion is configured to estimate the at least one of the relative displacement movement of the unsprung portions for the left and right wheels on the front side of the vehicle and the relative displacement movement of the unsprung portions for the left and right wheels on the rear side of the vehicle, on the basis of the at least one of: the at least one of the front-wheel-side relative stroke movement and the rear-wheel-side relative stroke movement; and the roll movement of the body of the vehicle, from which is excluded the estimated at least one of: the at least one of the front-wheel-side relative stroke movement and the rear-wheel-side relative stroke movement; and the roll movement of the body of the vehicle.

In an instance where the vehicle-turning-dependent-roll restraining control and the road-surface-unevenness-dependent-roll restraining control are executed concurrently, each roll restraining device generates the roll restraining forces in the respective controls. Accordingly, it may be impossible, due to the influence of the roll restraining force in the vehicle-turning-dependent-roll restraining control, to accurately estimate the relative stroke movements and the roll movement of the vehicle body caused by the unevenness of the road surface, by estimation that is based on merely the measured data such as the stroke amounts and the roll amount of the vehicle. According to this form, the target road-surface-unevenness-dependent-roll restraining force is determined so as to exclude the influence of the roll restraining force in the vehicle-turning-dependent-roll restraining control. Therefore, even where the above-described two controls are executed concurrently, an appropriate road-surface-unevenness-dependent-roll restraining control is executable.

(34) The body-roll restraining system according to any one of the forms (9)-(33), wherein the road-surface-unevenness-dependent-roll-restraining-force determining portion includes both of the skyhook-type roll-restraining-force determining portion and the roll-causing-force-reduction-type roll-restraining-force determining portion.

This form is regarded as a base of the following forms in which both of the skyhook-type roll restraining control and the roll-causing-force-reduction-type roll restraining control are executable.

(35) The body-roll restraining system according to the form (34), wherein the road-surface-unevenness-dependent-roll-restraining-force determining portion is configured to determine the target road-surface-unevenness-dependent-roll restraining force by summing (A) the target road-surface-unevenness-dependent-roll restraining force determined by the skyhook-type roll-restraining-force determining portion; and (B) the target road-surface-unevenness-dependent-roll restraining force determined by the roll-causing-force-reduction-type roll-restraining-force determining portion after having been weighted with a weighting coefficient.

Because the skyhook-type roll restraining control and the roll-causing-force-reduction-type roll restraining control depend on mutually different roll behavior models, the two controls have mutually different characteristics. In the roll restraining system configured such that both of the two controls are executable, one of the two controls are selectively executed depending upon the running state of the vehicle, the condition of the road surface on which the vehicle runs, and so on. In this form, one of the two controls is not merely selectively executed, but the two controls are concurrently executable while taking account of the characteristics of the two controls, for instance. The "weighting coefficient" in this form may be set so as to be fixed or may be set so as to change in steps or steplessly, i.e., continuously, depending upon certain situations and conditions.

(36) The body-roll restraining system according to the form (35), wherein the road-surface-unevenness-dependent-roll-restraining-force determining portion is configured such that a degree of weighting with respect to the target road-surface-unevenness-dependent-roll restraining force determined by the skyhook-type roll-restraining-force determining portion is made large where a relatively high-frequency vibration component is large in a roll vibration of the body of the vehicle that arises from the road surface on which the vehicle travels and such that a degree of weighting with respect to the target road-surface-unevenness-dependent-roll restraining force determined by the roll-causing-force-reduction-type roll-restraining-force determining portion is made large where a relatively low-frequency vibration component is large in the roll vibration.

The roll-causing-force-reduction-type roll restraining control aims at reducing the above-described roll-causing force, and the determination accuracy of the target road-surface-unevenness-dependent-roll restraining force may be deteriorated due to the influence of the application delay of the roll-causing force as explained above. More specifically, where the relative displacement of the unsprung portions is regarded as a vibration, the determination accuracy of the target road-surface-unevenness-dependent-roll restraining force for the relative displacement of the unsprung portions in a comparatively high frequency range tends to be deteriorated. In this form, the weighting coefficient is changed taking the tendency into consideration, for instance, where the skyhook-type roll restraining control and the roll-causing-force-reduction-type roll restraining control are executed concurrently.

In this form, the estimation of the frequency of the vibration component, the estimation of the intensity of the vibration component in a specific frequency range, etc., can be conducted by filter processing of chronological changes of the roll movement of the vehicle body, the relative displacement movement of the unsprung portions, and so on. To be more specific, in this form, the weighting coefficient may be set or changed on the basis of a ratio between the intensity of the vibration in a specific high frequency range and the intensity of the vibration in a specific low frequency range.

(37) The body-roll restraining system according to any one of the forms (1)-(36), wherein each of the suspension devices has a wheel-holding member for holding a corresponding one of the wheels, wherein each of the front-wheel-side roll restraining device and the rear-wheel-side roll restraining device includes a stabilizer bar connected at opposite ends thereof respectively to the wheel-holding members of the respective suspension devices for the left and right wheels and configured to generate the roll restraining force, and wherein each of the front-wheel-side roll restraining device and the rear-wheel-side roll restraining device is configured such that the actuator changes, in accordance with an operation amount thereof, the roll restraining force to be generated by the stabilizer bar.

This form is a form in which the structure of each roll restraining device is concretely limited. This form relates to a system equipped with a so-called active stabilizer device as the roll restraining device. In this form, the structure of the roll restraining device is not particularly limited and may be constructed as follows, for instance. One stabilizer bar is divided at a middle portion thereof into a pair of stabilizer bar members between which the actuator is disposed. The thus constructed roll restraining device is configured such that the pair of stabilizer bar members are rotated relative to each other by the actuator based on a force generated by the electric motor, so as to change the roll restraining force. Further, the roll restraining device may be configured such that the actuator is disposed between one end of the stabilizer bar and the wheel holding member of one of the left and right suspension devices, and the distance between the one end and the wheel holding member is changed by the actuator so as to change the roll restraining force.

In the roll restraining device according to this form, the roll restraining force is generated by the twist-reacting force of the stabilizer bar and the twist amount of the stabilizer bar is changed in accordance with the operational amount of the actuator, whereby the roll restraining force is changed. Where the operational amount of the actuator is 0, namely, where the operational position of the actuator is located at a neutral position, the stabilizer bar generates the roll restraining force in accordance with the twist rigidity thereof. In other words, the roll restraining device has a function similar to that of the conventional stabilizer device, namely, the non-active stabilizer device. By permitting the actuator to operate from the neutral position, the roll restraining force is increased or decreased by an amount corresponding to the operational amount of the actuator as if the rigidity of the stabilizer bar is changed.

(38) The body-roll restraining system according to the form (37), wherein the stabilizer bar is constituted by a pair of stabilizer bar members each including: a torsion bar portion disposed on an axis line that extends in a width direction of the vehicle; and an arm portion which extends continuously from the torsion bar portion so as to intersect the torsion bar portion and which is connected at a distal end portion thereof to the wheel-holding member, and wherein the actuator is configured to rotate the torsion bar portions of the pair of stabilizer bar members relative to each other about the axis line.

In this form, the structure of each roll restraining device, more specifically, the structure of the stabilizer bar and the actuator, is limited. According to this form, the roll restraining force generated by the roll restraining device can be efficiently changed.

(39) The body-roll restraining system according to the form (38), wherein the actuator includes an electric motor, a decelerator which decelerates rotation of the electric motor, and a housing which holds the electric motor and the decelerator, and wherein the torsion bar portion of one of the pair of stabilizer bar members is connected to the housing so as to be unrotatable relative to the housing while the torsion bar portion of the other of the pair of stabilizer bar members is connected to an output portion of the decelerator so as to be unrotatable relative to the output portion.

In this form, the structure of the actuator, the connection manner of the actuator and the stabilizer bar, and the disposition relation of the actuator and the stabilizer bar are specifically limited. The mechanism of the decelerator of the actuator in this form is not particularly limited. There may be employed decelerators of various mechanisms such as a harmonic gear mechanism (called "HARMONIC DRIVE (trademark) mechanism" and also called "strain wave gear ring mechanism") and a hypocycloid decelerating mechanism. For downsizing the electric motor, it is preferable that the reduction ratio of the decelerator be relatively large. In this respect, the large reduction ratio means that the operational amount of the actuator with respect to the operation amount of the electric motor is small. In view of this, the decelerator that employs the harmonic gear mechanism is suitable in the system according to this form.

While various forms of the claimable invention have been explained, the "roll amount of the vehicle body" may be interpreted as the relative displacement amount of the left sprung portion and the right sprung portion, for instance. In some of the above-described forms, the explanation is made on the interpretation. In addition to the interpretation, the roll amount of the vehicle body may be interpreted as a roll angle of the vehicle body, namely, an inclination angle of a straight line connecting the left and right sprung portions, for instance. According to this interpretation, the "relative displacement amount of the left and right unsprung portions" may be treated as a relative displacement amount converted into the roll angle, namely, an inclination angle of a straight line connecting the left and right unsprung portions. In this instance, the "relative stroke amount" may be treated as a difference between the roll angle of the vehicle body and the inclination angle of the straight line connecting the left and right unsprung portions, and the roll speed and acceleration, the speed and acceleration of the relative displacement of the left and right unsprung portions, and the relative stroke speed and acceleration may be treated in accordance with the roll amount of the vehicle body. In other words, in various forms indicated above, the roll amount of the vehicle body may be regarded as the roll angle of the vehicle body, and the movement of the sprung portion and the unsprung portion, the roll behavior model, etc., may be represented in a unit system corresponding to the roll angle. Forms that employ such representation can be forms of the claimable invention.

Where the roll restraining device includes the above-indicated stabilizer bar, the roll restraining force to be generated by such a roll restraining device may be considered as a force in which two components, i.e., a basic roll restraining force and a control roll restraining force, are combined. The basic roll restraining force is a roll restraining force that is intrinsically generated by the stabilizer bar, namely, a roll restraining force in an instance where the operational amount of the actuator is 0. The control roll restraining force is a roll restraining force that is increased and decreased in accordance with the operational amount of the actuator. Under the concept, for the sake of convenience, the basic roll restraining force is integrated into the force to be generated by the suspension springs for restraining the body roll, that is, the basic roll restraining force is treated as a part of that force, and only the control roll restraining force may be treated as the roll restraining force to be generated by the roll restraining device. With the basic roll restraining force and the control roll restraining force treated as described above, the roll behavior model can be set, whereby the road-surface-unevenness-dependent-roll restraining control can be executed and the vehicle-turning-dependent-roll restraining control can be executed. Even where the controls are thus executed, both of the two controls are equivalent to those when executed based on the roll restraining force that is actually generated by the roll restraining device. Therefore, the forms described above should be construed as including a form in which only the control roll restraining force is treated as the roll restraining force generated by the roll restraining device, and such a form is one kind of the claimable invention.

BRIEF DESCRIPTION OF THE DRAWINGS

FIG. 9 is another conceptual view for explaining the manner of setting the roll-causing-force reduction gain used in the control according to the model of FIG. 7.

BEST MODE FOR CARRYING OUT THE INVENTION

Figure 1:
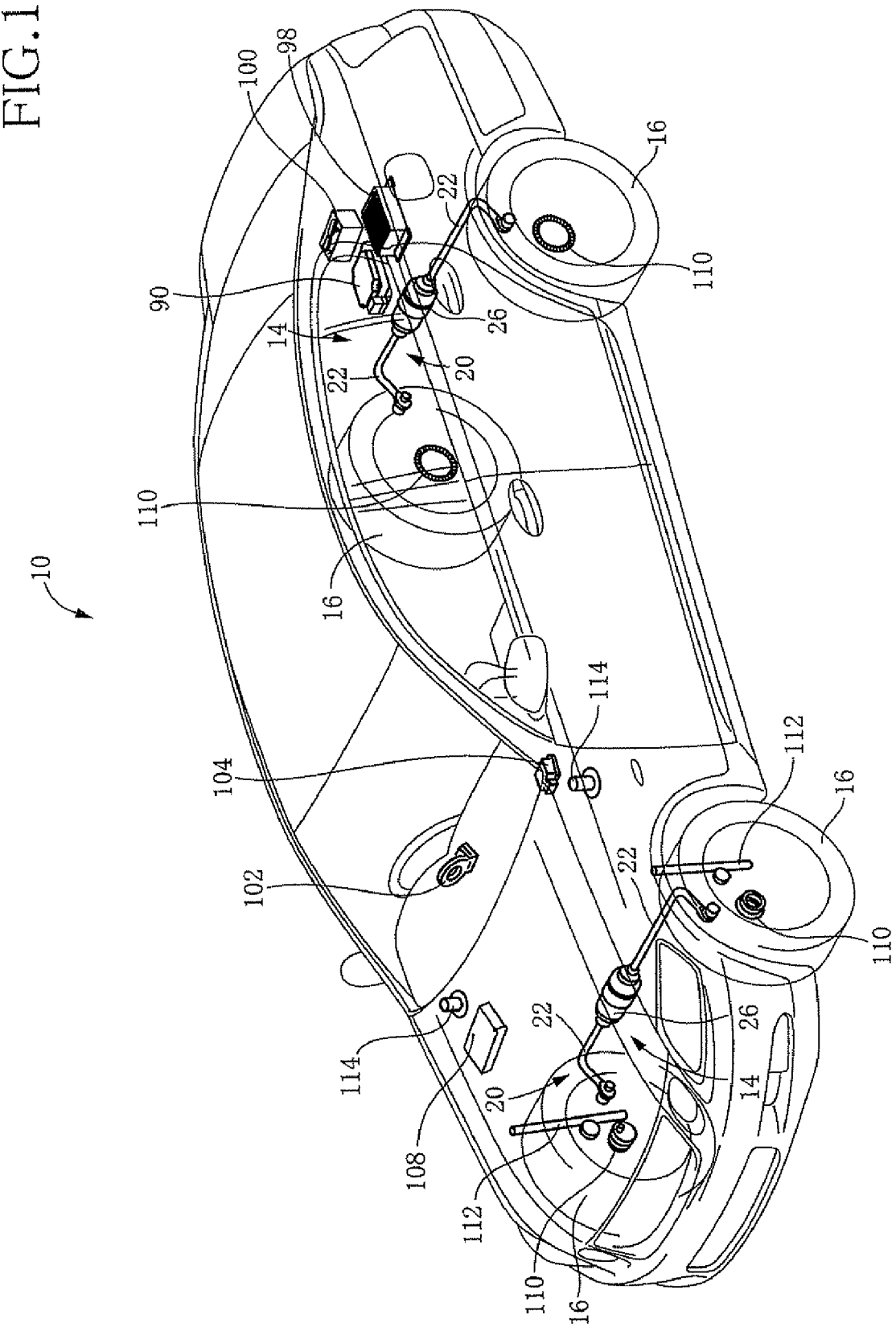
FIG. 1 is a perspective view showing an overall structure of a body-roll restraining system for a vehicle according to one embodiment of the claimable invention.

There will be described in detail one embodiment according to the claimable invention, referring to the drawings. It is to be understood, however, that the claimable invention is not limited to the details of the following embodiment but may be embodied with various changes and modifications, such as those described in the FORMS OF THE CLAIMABLE INVENTION, which may occur to those skilled in the art.

<Structure of Body-Roll Restraining System and Function of Stabilizer Device>

(a) Overall Structure

FIG. 1 schematically shows a body-roll restraining system 10 according to the present embodiment. The body-roll restraining system 10 includes a pair of stabilizer devices 14, as a pair of roll restraining devices, which are respectively disposed on a front-wheel side and a rear-wheel side, of the vehicle. Each stabilizer device 14 includes a stabilizer bar 20 whose opposite ends are respectively connected to wheel-holding members in the form of suspension arms (FIGS. 2 and 3) for holding left and right wheels 16, respectively. The stabilizer bar 20 is divided into two portions so as to include a pair of stabilizer bar members 22, 22. The pair of stabilizer bar members 22, 22 are connected by an actuator 26 so as to be rotatable relative to each other.

(b) Structure of Suspension Device

Figure 2:
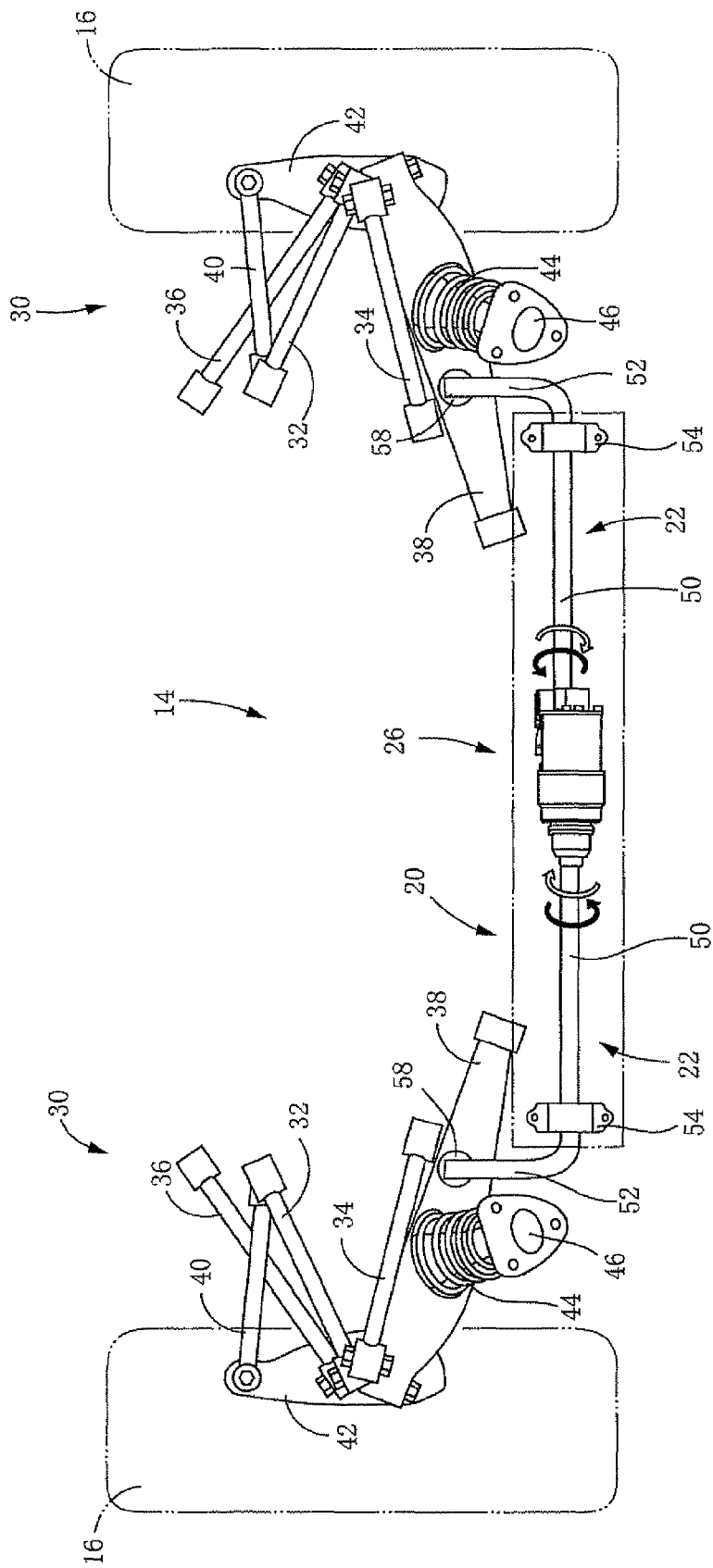
FIG. 2 is a plan view showing a stabilizer device as a roll restraining device of the system of FIG. 1.
Figure 3:
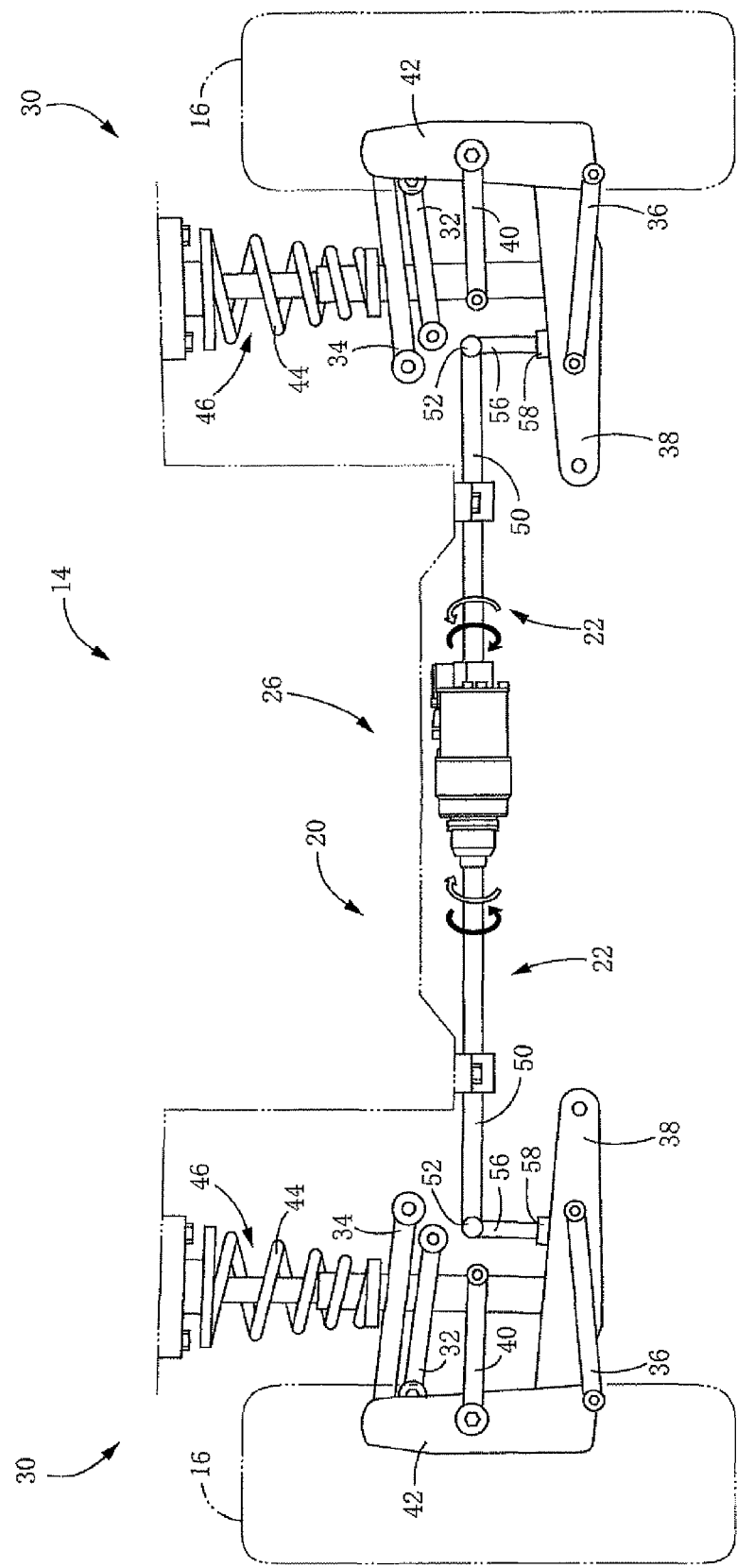
FIG. 3 is a front view showing the stabilizer device as the roll restraining device of the system of FIG. 1.

On the vehicle on which the present system 10 is mounted, four suspension devices are provided so as to correspond to respective four wheels 16. Two of the four suspension devices for the respective two front wheels that can be steered are substantially identical in construction with another two of the four suspension devices for the respective two rear wheels that cannot be steered, except for a mechanism that enables the wheels to be steered. Accordingly, the suspension devices for the rear wheels are explained for the sake of brevity. Each suspension device generally indicated at 30 in FIGS. 2 and 3 is of an independent type and a multi link type. The suspension device 30 includes a first upper arm 32, a second upper arm 34, a first lower arm 36, a second lower arm 38, and a toe control arm 40, each as the suspension arm. One end of each of the five arms 32, 34, 36, 38, 40 is rotatably connected to a body of the vehicle while the other end is rotatably connected to an axle carrier 42 which rotatably holds a corresponding one of the four wheels 16. Owing to the five arms 32, 34, 36, 38, 40, the axle carrier 42 is vertically movable relative to the vehicle body along a substantially constant locus. The suspension device 30 includes a coil spring 44 as a suspension spring and a hydraulic shock absorber 46 as a damper which are disposed in parallel with each other between the second lower arm 38 and a mount portion that is provided in a tire housing. That is, each suspension device 30 is configured to elastically connect the corresponding wheel 16 and the vehicle body, namely, an unsprung portion and a sprung portion, and to generate a damping force with respect to a movement of the unsprung portion and the sprung portion toward and away from each other (hereinafter referred to as "stroke movement" where appropriate).

(c) Structure of Stabilizer Device

As shown in FIGS. 2 and 3, each stabilizer bar member 22 of the stabilizer device 14 includes a torsion bar portion 50 extending generally in the width direction of the vehicle and an arm portion 52 extending integrally from the torsion bar portion 50 generally in the frontward direction of the vehicle so as to intersect the torsion bar portion 50. The torsion bar portion 50 of each stabilizer bar member 22 is rotatably supported, at a position thereof near to the arm portion 52, by a holding member 54 fixedly disposed on the vehicle body. The torsion bar portions 50 of the respective stabilizer bar members 22 are disposed coaxially relative to each other. One end of each torsion bar portion 50 which is opposite to the other end thereof near to the arm portion 52 is connected to the actuator 26 as explained below in detail. One end of each arm portion 52 which is opposite to the other end thereof near to the torsion bar portion 50 is connected to the second lower arm 38 via a link rod 56. The second lower arm 38 is provided with a link-rod connecting portion 58. One end of the link rod 56 is swingably connected to the link-rod connecting portion 58 while the other end thereof is swingably connected to the above-indicated one end of the arm portion 52 of the stabilizer bar member 22.

Figure 4:
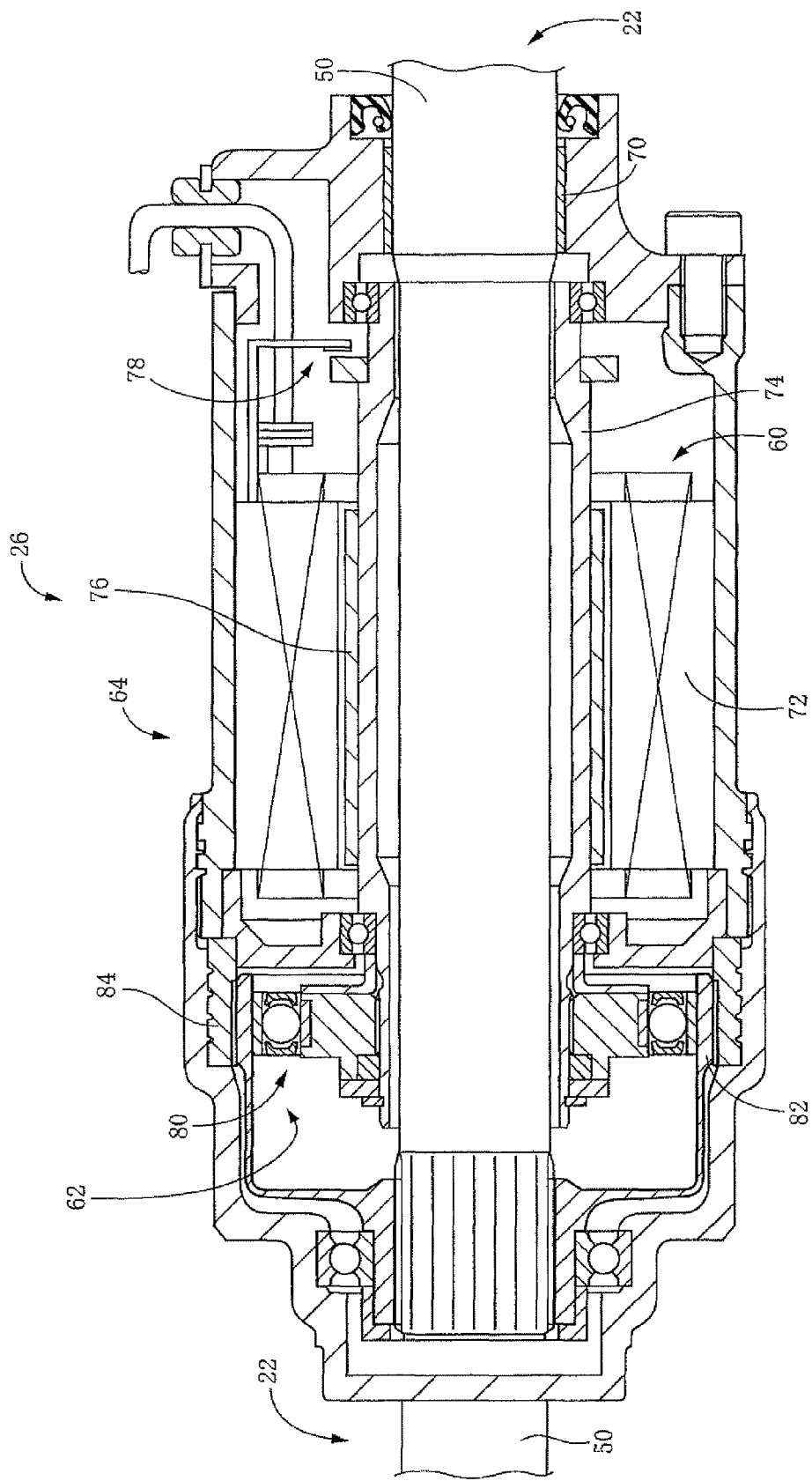
FIG. 4 is a cross sectional view of an actuator of the stabilizer device shown in FIGS. 2 and 3.

As shown in FIG. 4, the actuator 26 of the stabilizer device 14 includes an electric motor 60 as a drive source and a decelerator 62 configured to decelerate rotation of the electric motor 60. The electric motor 60 and the decelerator 62 are disposed in a housing 64 as an outer shell member of the actuator 26. The above-indicated one end of the torsion bar portion 50 of one of the pair of stabilizer bar members 22 is fixedly connected to one of opposite ends of the housing 64. The other of the pair of stabilizer bar members 22 is disposed so as to extend into the housing 64 at the other of the opposite ends of the housing 64 and is connected to the decelerator 62 as explained below in detail. Further, the other of the pair of stabilizer bar members 22 is rotatably held, at its axially intermediate portion, by the housing 64 via a bush bearing 70.

The electric motor 60 includes: a plurality of coils 72 fixedly disposed on one circumference along an inner circumferential surface of the cylindrical wall of the housing 64; a hollow motor shaft 74 rotatably held by the housing 64; and permanent magnets 76 fixedly disposed on the outer circumference of the motor shaft 74 so as to face the coils 72. The electric motor 60 is a motor in which the coils 72 function as a stator and the permanent magnets 76 function as a rotor, and is a three-phase DC brushless motor. In the housing 64, there is disposed a motor-rotational-angle sensor 78 for detecting a rotational angle of the motor shaft 74, namely, a rotational angle of the electric motor 60. The motor-rotational-angle sensor 78 is constituted principally by an encoder and utilized in the control of the actuator 26, namely, in the control of the stabilizer device 14.

In the present embodiment, the decelerator 62 is constituted as a harmonic gear mechanism (called "HARMONIC DRIVE (trademark) mechanism" and also called "strain wave gear ring mechanism") including a wave generator 80, a flexible gear 82, and a ring gear 84. The wave generator 80 includes an oval cam and ball bearings fitted on a periphery of the cam, and is fixed to one end of the motor shaft 74. The flexible gear 82 is a cup-like member whose cylindrical wall portion is elastically deformable. A plurality of teeth (400 teeth in the present decelerator 62) are formed on an outer circumference of the cylindrical wall portion at its open end. The flexible gear 82 is connected to and held by the above-indicated one end of the torsion bar portion 50 of the other of the pair of stabilizer bar members 22. More specifically, the torsion bar portion 50 of the other of the pair of stabilizer bar members 22 penetrates the motor shaft 74 and has an end portion extending from or beyond the one end of the motor shaft 74. To the outer circumferential surface of this end portion, a bottom portion of the flexible gear 82 as the output portion of the decelerator 62 is connected by spline fitting so as to be unrotatable relative to each other, with the end portion penetrating the bottom portion of the flexible gear 82. The ring gear 84 is a generally ring-like member and is fixed to the housing 64. A plurality of teeth (402 teeth in the present decelerator 62) are formed on an inner circumference of the ring gear 84. The flexible gear 82 is fitted at its cylindrical wall portion on the wave generator 80 and is elastically deformed into an oval shape. The flexible gear 82 meshes the ring gear 84 at two portions thereof corresponding to opposite ends of the long axis of the oval and does not mesh the same 84 at portions thereof other than the two portions. In the thus constructed decelerator 62, with one rotation of the wave generator 80 (i.e., after rotation of the wave generator 80 by 360°), in other words, after one rotation of the motor shaft 74 of the electric motor 60, the flexible gear 82 and the ring gear 84 are rotated relative to each other by an amount corresponding to the two teeth. That is, the reduction ratio of the decelerator 62 is made equal to 1/200.

(d) Function of Stabilizer Device

In the structure, the vehicle body undergoes roll moment due to turning of the vehicle where the vehicle turns and due to unevenness of a road surface where the vehicle runs on the road surface with the unevenness. Due to the roll moment, each suspension device 30 suffers from a force by which a distance between one of the left and right wheels 16 and the vehicle body and a distance between the other of the left and right wheels 16 and the vehicle body are changed relative to each other, namely, a force by which a distance between the sprung portion and the unsprung portion on the left side and a distance between the sprung portion and the unsprung portion on the right side are changed relative to each other. That is, a relative stroke movement is generated. To deal with the relative stroke movement, the left and right coil springs 44 on each of the front-wheel side and the rear-wheel side generate an elastic reaction force in a direction so as to reduce a relative stroke amount. Further, the left and right shock absorbers 46 on each of the front-wheel side and the rear-wheel side generate a damping force in accordance with a relative stroke speed. The above-indicated elastic reaction force is a force whose magnitude relies on a specific roll spring constant that depends on spring constants of the respective left and right coil springs 44. The above-indicated damping force is a force whose magnitude relies on a specific roll damping coefficient that depends on damping coefficients of the respective left and right shock absorbers 46.

In the stabilizer device 14, the stabilizer bar 20 is twisted by the above-indicated relative stroke movement, so that there is generated, based on a twist-reacting force of the stabilizer bar 20, a roll restraining force by which the sprung portion and unsprung portion on one of the left side and the right side approach toward each other and the sprung portion and unsprung portion on the other of the left side and the right side are moved away from each other. The roll restraining force is a force whose magnitude relies on a roll spring constant of the stabilizer bar 20 that depends on a twisting spring constant of the same 20. This state is a state in which the left and right stabilizer bar members 22 are not being rotated relative to each other by the actuator 26, namely, a state in which the actuator is in a neutral operational position.

In contrast, the actuator 26 operates by a prescribed operational amount, namely, by a prescribed angle, whereby the left and right stabilizer bar members 22 are rotated relative to each other by the prescribed angle. In this state, the roll restraining force is changed in accordance with the relative rotational angle. Accordingly, the stabilizer device 14 changes the roll restraining force in accordance with the operational amount of the actuator 26 as if the twisting rigidity of the stabilizer bar 20 increases or decreases. In other words, the roll restraining force is increased or decreased as if the roll spring constant of the stabilizer device 14 per se is changed.

The roll restraining force F' to be generated by the stabilizer device 14 is represented generally by the following formula (1'):

$$F'=K_S S_T+K_S D \tag{1'}$$

$K_S$: roll spring constant of stabilizer bar
$S_T$: relative stroke amount
D: operational amount of stabilizer device Here, the roll spring constant $K_S$ of the stabilizer bar 20 is equal to a roll spring constant in an instance where it is assumed that the two stabilizer bar members 22 are integrated or united, and is an intrinsic value of the stabilizer bar 20 per se. The relative stroke amount $S_T$ may be considered as a difference between: the distance between the sprung portion and the unsprung portion on the left-wheel side; and the distance between the sprung portion and the unsprung portion on the right-wheel side. The operational amount D of the stabilizer device 14 may be considered as an amount indicative of how much the stabilizer device 14 operates, in terms of the relative stroke amount $S_T$, by the operation of the actuator 26. The operational amount D of the stabilizer device 14 can be approximated by the following formula (2):

$$D=AL_A/R \tag{2}$$

A: operational amount (rotational angle) of actuator
$L_A$: length of arm portion of stabilizer bar member
R: lever ratio of second lower arm It is noted that the operational amount A of the actuator is the operational amount in an instance where a state in which the operational amount D of the stabilizer device 14 is zero is a basic state, namely, the operational amount from the neutral position.

As apparent from the above formulas, the roll restraining force F' to be generated by the stabilizer device 14 may be considered as a sum of: a basic roll restraining force ($K_S S_T$) to be intrinsically generated based on the roll spring constant $K_S$ of the stabilizer bar; and a control roll restraining force ($K_S D$) for increasing or decreasing the basic roll restrain force by controlling the actuator 26. By changing the control roll restraining force owing to the control of the actuator 26, the roll restraining force F' is changed. In the following explanation, the basic roll restraining force ($K_S S_T$) is regarded as a part of a force to be generated by the coil spring(s) 44 for restraining the roll of the vehicle body, and the control roll restraining force ($K_S D$) is treated as a roll restraining force F by the stabilizer device 14. In terms of this, the above formula (1') becomes the following formula (1):

$$F=K_S D \tag{1}$$

(e) Hardware Structure of Control System

Figure 11:
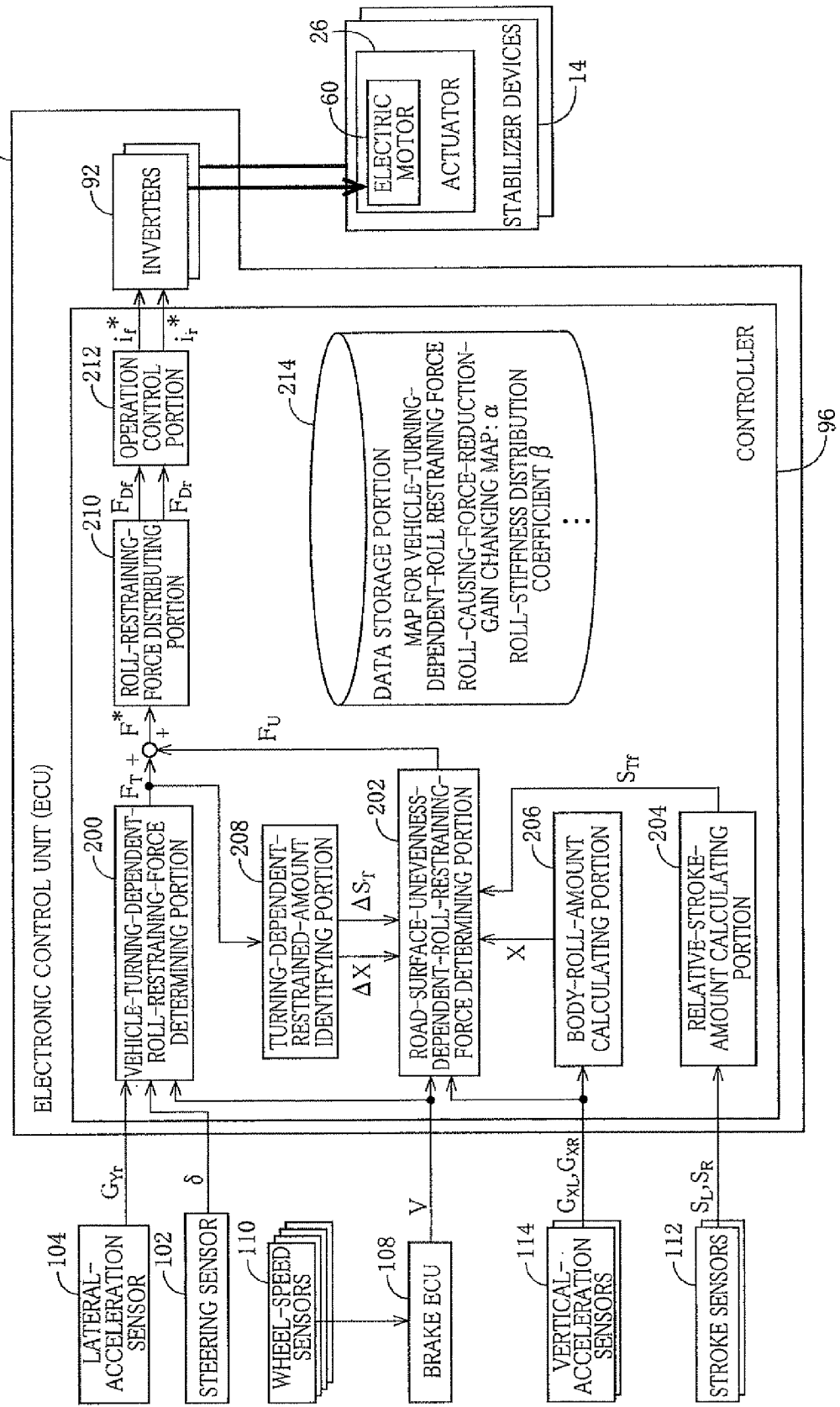
FIG. 11 is a block diagram for explaining functions of a controller of the system of FIG. 1.

As shown in FIG. 1, the present body-roll restraining system 10 includes an electronic control unit (ECU) 90 which exercises control over the two stabilizer devices 14. The ECU 90 is a control device which controls operations of the two stabilizer devices 14 independently of each other, namely, operations of the two actuators 26 independently of each other. As shown in FIG. 11, the ECU 90 includes: two inverters 92, each as a drive circuit, respectively corresponding to the electric motors 60 of the respective actuators 26; and a controller 96 constituted mainly by a computer equipped with a CPU, a ROM, a RAM, and so on. The inverters 92 are connected to a battery 100 via a converter 98. The inverters 92 are connected to the corresponding electric motors 60 of the respective stabilizer devicees 14. Each of the electric motors 60 is configured to be driven at a constant voltage, and the amount of electric power to be supplied to the electric motor 60 is changed by changing the amount of electric current to be supplied. In this respect, the supply amount of electric current is changed such that the corresponding inverter 92 changes a ratio (duty ratio) of a pulse-on time to a pulse-off time by PWM (Pulse Width Modulation).

To the controller 96, there are connected, in addition to the above-indicated motor-rotational-angle sensors 78, a steering sensor 102 for detecting an operational angle (as a sort of a steering angle) of the steering wheel and a lateral-acceleration sensor 104 for detecting actual lateral acceleration that is lateral acceleration actually being generated in the vehicle body. There is further connected, to the controller 96, a brake electronic control unit (hereinafter referred to as "brake ECU" where appropriate) 108 as a control device for a brake system. To the brake ECU 108, there are connected four wheel-speed sensors 110 which are provided for the respective four wheels for detecting rotational speeds of the respective wheels. The brake ECU 108 has a function of estimating the vehicle speed based on values detected by the respective wheel-speed sensors 110. The controller 96 is configured to obtain the vehicle speed from the brake ECU 108 as needed. To the controller 96, there are further connected stroke sensors 112 which are provided for the left and right wheels 16 on the front-wheel side of the vehicle. Each stroke sensor 112 is configured to detect a stroke amount that is a distance between the sprung portion and the unsprung portion. The vehicle is provided with a pair of vertical-acceleration sensors 114 for detecting vertical acceleration respectively at specific positions of the left and right portions of the vehicle body. The vertical-acceleration sensors 114 are also connected to the controller 96. The controller 96 is connected to the inverters 92 and controls the electric motors 60 of the respective stabilizer devices 14 by controlling the inverters 92. The ROM of the computer of the controller 96 stores programs relating to the control of the stabilizer devices 14 which will be explained below, various data to be utilized in the control, and so on.

<Roll Restraining Control>

As the roll restraining control, the following two controls are executed in the present system 10: a vehicle-turning-dependent-roll restraining control for restraining roll of the vehicle body that arises from turning of the vehicle; and a road-surface-unevenness-dependent-roll restraining control for restraining roll of the vehicle body that arises from unevenness of the road surface on which the vehicle runs. In the present system 10, those two controls are concurrently executable, and the stabilizer device 14 on the front-wheel side and the stabilizer device 14 on the rear-wheel side are controlled independently of each other in any of the two controls. Initially, the two controls will be explained in order. Thereafter, there will be explained a manner of distributing the roll restraining force to the two stabilizer devices in an instance where the two controls are executed concurrently.

a) Vehicle-Turning-Dependent-Roll Restraining Control

The vehicle-turning-dependent-roll restraining control is executed such that the roll restraining force to be generated by both of the front-wheel-side and the rear-wheel-side stabilizer devices 14 is determined as a target vehicle-turning-dependent-roll restraining force $F_T$, on the basis of a roll-moment index indicative of roll moment that acts on the vehicle body due to turning of the vehicle. The determined target vehicle-turning-dependent-roll restraining force $F_T$ is distributed into target device-individualized roll restraining forces $F_D$ to be generated by the respective stabilizer devices 14 on the front-wheel side and the rear-wheel side of the vehicle. The target device-individualized roll restraining forces $F_D$ are referred to as a front-wheel-side device-individualized roll restraining force $F_{Df}$ and a rear-wheel-side device-individualized roll restraining force $F_{Dr}$ where they need to be distinguished from each other. The front-wheel-side and the rear-wheel side stabilizer devices 14 are controlled on the basis of the respective target device-individualized roll restraining forces $F_D$.

In the determination processing of the target vehicle-turning-dependent-roll restraining force $F_T$, control-use lateral acceleration is employed as a vehicle-turning-dependent roll-moment index indicative of roll moment that acts on the vehicle body due to turning of the vehicle. The control-use lateral acceleration $G_Y^*$ is represented by the following formula (3):

$$G_Y^* = \epsilon_c G_{Yc} + \epsilon_r G_{Yr} \qquad (3)$$

$G_{Yc}$: estimated lateral acceleration
$G_{Yr}$: actual lateral acceleration
$\epsilon_c$: control gain
$\epsilon_r$: control gain The estimated lateral acceleration $G_{Yc}$ is obtained on the basis of an operational angle δ of the steering wheel and a vehicle speed v. The operational angle δ indicates a steering amount (steering angle) of the vehicle, and a value detected by the steering sensor 102 is utilized. The vehicle speed v is estimated in the brake ECU 108 on the basis of values detected by the wheel-speed sensors 110, and a value sent from the brake ECU 108 is utilized as the vehicle speed v. The control gains $\epsilon_c$, $\epsilon_r$ are set at appropriate values in view of responsiveness of the vehicle-turning-dependent-roll restraining control, an so on.

The target vehicle-turning-dependent-roll restraining force $F_T$ is determined referring to a map for the vehicle-turning-dependent-roll restraining force stored in the controller 96, on the basis of the control-use lateral acceleration $G_Y^*$. This map stipulates a specific rule, namely, the map specifies what extent of the amount the vehicle body undergoes the roll and to what degree the roll should be restrained, with respect to the control-use lateral acceleration $G_Y^*$ being generated. By referring to the map, it is also possible to obtain, from the map, a restrained roll amount $\Delta X$ and a restrained relative stroke amount $\Delta S_T$ as a restraining amount of the roll of the vehicle body in an instance where the target vehicle-turning-dependent-roll restraining force $F_T$ is acting on the vehicle.

(b) Road-Surface-Unevenness-Dependent-Roll Restraining Control

The road-surface-unevenness-dependent-roll restraining control is executed such that a sum of the roll restraining forces to be generated by both of the front-wheel-side and the rear-wheel-side stabilizer devices 14 is determined as a target road-surface-unevenness-dependent-roll restraining force $F_U$, according to preset roll behavior models. The determined target road-surface-unevenness-dependent-roll restraining force $F_U$ is distributed into the target device-individualized roll restraining forces $F_D$ to be generated by the respective stabilizer devices 14 on the front-wheel side and the rear-wheel side of the vehicle. The front-wheel-side and the rear-wheel side stabilizer devices 14 operate so as to be controlled on the basis of the respective target device-individualized roll restraining forces $F_D$.

There are prepared two roll behavior models indicative of an ideal control state in the road-surface-unevenness-dependent-roll restraining control. In the road-surface-unevenness-dependent-roll restraining control, there are executed, at a certain time, one of or both of two sorts of controls respectively corresponding to the two models. Hereinafter, there will be first explained a roll behavior model to be compared with the two ideal-control-state models and subsequently explained each of the two sorts of controls and selection and weighting of the two sorts of the controls.

(i) Roll Behavior Model Based on System Structure

Figure 5:
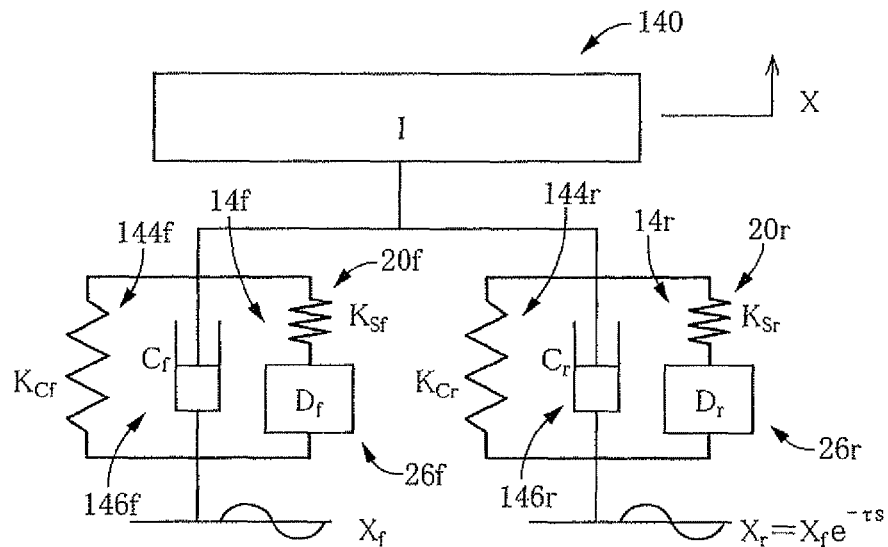
FIG. 5 is a conceptual view showing a real-device model on which a road-surface-unevenness-dependent-roll restraining control executed in the body-roll restraining system of FIG. 1 depends.

FIG. 5 shows a roll behavior model based on the structures of the actual suspension device and stabilizer device (hereinafter referred to as a "real-device model" where appropriate). This model is to be compared with the two ideal-control-state models that will be explained, for determining the target road-surface-unevenness-dependent-roll restraining force $F_U$ that is a target roll restraining force in the road-surface-unevenness-dependent-roll restraining control.

The real-device model includes: a front-wheel-side-relative-stroke-relation spring 144f, a front-wheel-side-relative-stroke-relation damper 146f, and the front-wheel-side stabilizer device 14f, between the vehicle body 140 and the wheels 16, namely, between the sprung portion and the unsprung portion, on the front-wheel side (on the left side in FIG. 5); and a rear-wheel-side-relative-stroke-relation spring 144r, a rear-wheel-side-relative-stroke-relation damper 146r, and the rear-wheel-side stabilizer device 14r, between the sprung portion and the unsprung portion on the rear-wheel side (on the right side in FIG. 5). The relative-stroke-relation spring 144 is a virtual suspension spring that generates an elastic reaction force in accordance with the relative stroke amount on the front-wheel side or the rear-wheel side by the two coil springs 44 on the front-wheel side or the rear-wheel side. The relative-stroke-relation damper 146 is a virtual damper that generates a damping force in accordance with the relative stroke speed on the front-wheel side or the rear-wheel side by the two shock absorbers 46 on the front-wheel side or the rear-wheel side. The front-wheel-side-relative-stroke-relation spring 144f, the front-wheel-side-relative-stroke-relation damper 146f, the rear-wheel-side-relative-stroke-relation spring 144r, and the rear-wheel-side-relative-stroke-relation damper 146r are hereinafter referred to as "front-wheel-side spring 144f", "front-wheel-side damper 146f", "rear-wheel-side spring 144r", "rear-wheel-side damper 146r", respectively, where appropriate.

An equation of motion of the real-device model is represented by the following formula (4):

$$[Is^2+(C_f+C_r)s+(K_f+K_r)]X=(C_f s+K_f)X_f+(C_r s+K_r)X_r+K_{Sf}D_f+K_{Sr}D_r \quad (4)$$

s: Laplace operator, d/dt, iω
I: moment of inertia of vehicle body
X: roll amount of vehicle body
$X_f$: relative displacement amount of front-wheel-side unsprung portions
$X_r$: relative displacement amount of rear-wheel-side unsprung portions
$C_f$: roll damping coefficient of front-wheel-side damper
$C_r$: roll damping coefficient of rear-wheel-side damper
$K_f$: roll spring constant of front-wheel-side spring
$K_r$: roll spring constant of rear-wheel-side spring
$K_{Sf}$: roll spring constant of front-wheel-side stabilizer bar
$K_{Sr}$: roll spring constant of rear-wheel-side stabilizer bar
$D_f$: operational amount of front-wheel-side stabilizer device
$D_r$: operational amount of rear-wheel-side stabilizer device On the basis of the above formula (4), the roll restraining force F (to be specific, the control roll restraining force) to be generated by the front-wheel-side and the rear-wheel-side stabilizer devices 14 is represented by the following formula (5):

$$F=K_{Sf}D_f+K_{Sr}D_r \quad (5)$$

As explained above, the basic roll restraining force of the stabilizer bar 20 is regarded as a part of the force to be generated by the relative-stroke-relation spring 144 for restraining the roll of the vehicle body. Accordingly, the following formulas (6) and (7) are established:

$$K_f=K_{Cf}+K_{Sf} \quad (6)$$

$$K_r=K_{Cr}+K_{Sr} \quad (7)$$

$K_{Cf}$: roll spring constant on the basis of only front-wheel-side-relative-stroke-relation spring
$K_{Cr}$: roll spring constant on the basis of only rear-wheel-side-relative-stroke-relation spring Further, the following formulas (8), (9), and (10) are established on the basis of a delay of the relative displacement of the rear-wheel-side unsprung portions with respect to the relative displacement of the front-wheel-side unsprung portions (hereinafter referred to as "displacement delay of the rear-wheel-side unsprung portions" where appropriate):

$$X_r=X_f e^{-\tau s} \quad (8)$$

$$e^{-\tau s} \approx (2-\tau s)/(2+\tau s) \quad (9)$$

$$\tau=L/v \quad (10)$$

L: wheel base
v: vehicle speed
$e^{-\tau s}$: coefficient of displacement delay of rear-wheel-side unsprung portions It is noted that the above formula (9) is for approximation.

(ii) Skyhook-Type Roll Restraining Control

Figure 6:
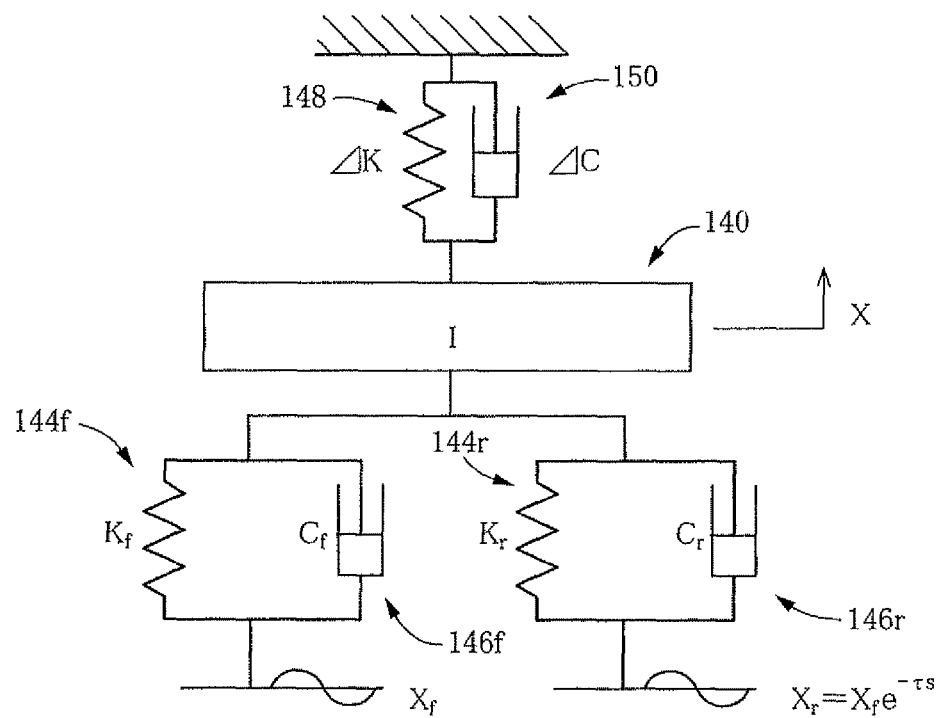
FIG. 6 is a conceptual view showing a skyhook model on which the road-surface-unevenness-dependent-roll restraining control executed in the body-roll restraining system of FIG. 1 depends.

In the skyhook-type roll restraining control as one of the above-indicated two sorts of the controls, there is employed a skyhook model shown in FIG. 6 as the ideal-control-state model to be compared with the above-indicated real-device model. The skyhook model includes: the front-wheel-side spring 144f and the front-wheel-side damper 146f between the sprung portion and the unsprung portion on the front-wheel side (on the left side in FIG. 6); and the rear-wheel-side spring 144r and the rear-wheel-side damper 146r between the sprung portion and the unsprung portion on the rear-wheel side (on the right side in FIG. 6). In addition to such a basic model, the skyhook model further includes a skyhook spring 148 and a skyhook damper 150 which have a function of restraining the roll of the vehicle body 140 based on a skyhook theory.

An equation of motion of the skyhook model is represented by the following formula (11):

$$[Is^2+(C_f s+K_f)+(C_r s+K_r)+(\Delta Cs+\Delta K)]X=(C_f s+K_f)X_f+(C_r s+K_r)X_r \quad (11)$$

ΔC: roll damping coefficient of skyhook damper
ΔK: roll spring constant of skyhook spring It is noted that the right-hand side of the formula (11) means a force that may be referred to as a so-called roll-causing force. The roll-causing force may be considered as a force that is generated relying on the relative displacement movement of the left and right unsprung portions and that causes the roll of the vehicle body. It is further noted that the left-hand side of the formula (11) may be considered as a force for restraining the roll of the vehicle body.

In the skyhook-type roll restraining control, there is determined the roll restraining force F to be generated by the front-wheel-side and rear-wheel-side stabilizer devices 14, namely, the target road-surface-unevenness-dependent-roll restraining force $F_U$ in the skyhook-type roll restraining control, by comparing the above formula (11) relating to the skyhook model and the above formula (4) relating to the real-device model. The target road-surface-unevenness-dependent-roll restraining force $F_U$ may be called a skyhook-type roll restraining force $F_S$ and is represented by the following formula (12):

$$F_S=K_{Sf}D_f+K_{Sr}D_r=-(\Delta Cs+\Delta K)X \quad (12)$$

As apparent from the above formula (12), it is needed to estimate the roll amount X of the vehicle body in determining the skyhook-type roll restraining force $F_S$. In the skyhook-type roll restraining control of the present system 10, therefore, the roll amount X of the vehicle body is estimated according to the skyhook model on the basis of a front-wheel-side relative stroke amount $S_{Tf}$. The front-wheel-side relative stroke amount $S_{Tf}$ is represented by the following formula (13) and measured on the basis of the values detected by the respective two stroke sensors 112, namely, on the basis of the detected values for left and right stroke amounts $S_{Lf}$, $S_{Lr}$ on the front-wheel side:

$$S_{Tf}=X_f-X \quad (13)$$

As explained above, since the vehicle-turning-dependent-roll restraining control is also executed in the present system 10, the measured front-wheel-side relative stroke amount $S_{Tf}$ is influenced by the control. In view of this, on the basis of the target vehicle-turning-dependent-roll restraining force $F_T$ that is currently being generated, the restrained relative stroke amount $\Delta S_T$ is obtained referring to the map for the vehicle-turning-dependent-roll restraining force explained above, and correction for excluding the restrained relative stroke amount $\Delta S_T$ is conducted according to the following formula (14) prior to the estimation of the roll amount X of the vehicle body:

$$S_{Tf}=S_{Tf}-\Delta S_T \qquad (14)$$

The estimation of the roll amount X of the vehicle body is conducted according to the above formula (11), on the basis of the corrected front-wheel-side relative stroke amount $S_{Tf}$, the vehicle speed v obtained from the brake ECU 108, and the wheel base L stored in the controller 96. Since the rear-wheel-side relative stroke amount $S_{Tr}$ is not measured, there is utilized the estimation indicated in the above formula (8), namely, the estimation of the relative displacement amount $X_r$ of the rear-wheel-side unsprung portions on the basis of the relative displacement amount $X_f$ of the front-wheel-side unsprung portions. In this respect, a value approximated according to the above formula (9) is utilized as the value of the displacement delay coefficient $e^{-\tau s}$ of the rear-wheel-side unsprung portions, in this estimation. The estimated roll amount X of the vehicle body is represented by the following formula (15)

$$X=S_{Tf}[(C_f s+K_f)+(C_r s+K_r)e^{-\tau s}]/[Is^2+(1-e^{-\tau s})(C_r s+K_r)+(\Delta C s+\Delta K)] \qquad (15)$$

On the basis of the thus estimated roll amount X of the vehicle body, the skyhook-type roll restraining force $F_s$ is determined according to the above formula (12).

Figure 7:
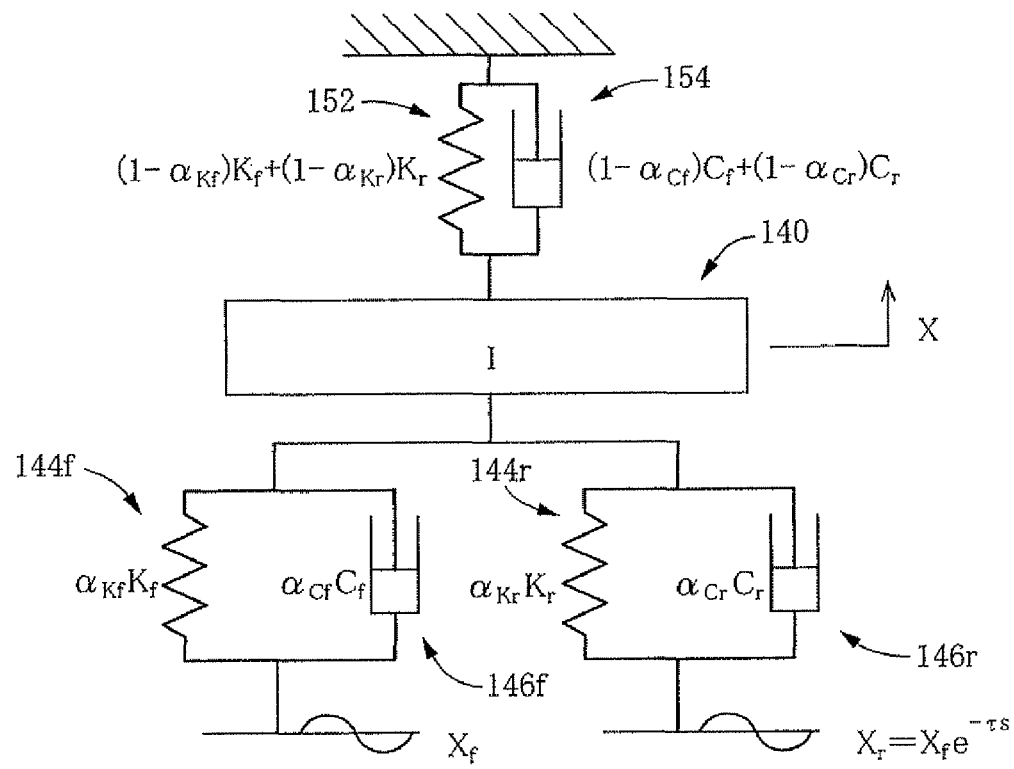
FIG. 7 is a conceptual view showing a roll-causing-force reduction model on which the road-surface-unevenness-dependent-roll restraining control executed in the body-roll restraining system of FIG. 1 depends.

(iii) Roll-Causing-Force-Reduction-Type Roll Restraining Control iii-a) Roll-Causing-Force Reduction Model In the roll-causing-force-reduction-type roll restraining control as the other of the above-indicated two sorts of the controls, there is employed a roll-causing-force reduction model as shown in FIG. 7 as the ideal-control-state model to be compared with the above-indicated real-device model. In addition to the above-described basic model, the roll-causing-force reduction model includes a roll restraining spring 152 and a roll restraining damper 154.

An equation of motion of the roll-causing-force reduction model is represented by the following formula (16):

$$[Is^2 + [a_{Cf}C_f s + a_{Kf}K_f] + \qquad (16)$$
$$[a_{Cr}C_r s + a_{Kr}K_r] + [(1-a_{Cf})C_f + (1-a_{Cr})C_r]s +$$
$$[(1-a_{Kf})K_f + (1-a_{Kr})K_r]]X =$$
$$(a_{Cf}C_f s + a_{Kf}K_f)X_f + (a_{Cr}C_r s + a_{Kr}K_r)X_r$$

$\alpha_{Cf}$: roll-causing-force reduction gain of front-wheel-side damper $\alpha_{Cr}$: roll-causing-force reduction gain of rear-wheel-side damper $\alpha_{Kf}$: roll-causing-force reduction gain of front-wheel-side spring $\alpha_{Kr}$: roll-causing-force reduction gain of rear-wheel-side spring The above formula (16) is simply represented as the following formula (17):

$$[Is^2 + (C_f + C_r)s + (K_f + K_r)]X = \qquad (17)$$
$$(a_{Cf}C_f s + a_{Kf}K_f)X_f + (a_{Cr}C_r s + a_{Kr}K_r)X_r$$

Like the skyhook model described above, the right-hand side of each of the above formulas (16) and (17) means the so-called roll-causing force while the left-hand side may be considered as the force for restraining the roll of the vehicle body.

The above-described skyhook-type roll restraining control aims at restraining the roll of the vehicle body by increasing the coefficient for the roll amount X of the vehicle body at the light-hand side of the formula (11). In contrast, the roll-causing-force-reduction-type roll restraining control aims at restraining the roll of the vehicle body by decreasing the value of the right-hand side of each of the formulas (16) and (17). To this end, the above-indicated four roll-causing-force reduction gains $\alpha_{Cf}$, $\alpha_{Cr}$, $\alpha_{Kf}$, and $\alpha_{Kr}$ are control gains for reducing respective four roll-causing forces, i.e., a front-wheel-side damper roll-causing force ($C_f s X_f$), a rear-wheel-side damper roll-causing force ($C_r s X_r$), a front-wheel-side spring roll-causing force ($K_f X_f$), and a rear-wheel-side spring roll-causing force ($K_r X_r$). Each roll-causing-force reduction gain $\alpha$ is arranged not to reduce the corresponding roll-causing force where the value of the gain $\alpha$ is "1" and to reduce the corresponding roll-causing force entirely where the value of the gain $\alpha$ is "0". Accordingly, a value indicated as (1−$\alpha$) has a meaning as a reduction ratio for each roll-causing force. In the following explanation, the respective roll-causing-force reduction gains $\alpha$ may be abbreviated as a front-wheel-side damper gain $\alpha a_{Cf}$, a rear-wheel-side damper gain $\alpha_{Cr}$, a front-wheel-side spring gain $\alpha_{Kf}$, and a rear-wheel-side spring gain $\alpha_{Kr}$.

The roll restraining spring 152 and the roll restraining damper 154 may be considered to have a function of generating, as the force for restraining the roll of the vehicle body, a force corresponding to a reduction force that corresponds to a reduction amount of the roll-causing force. Accordingly, the roll spring constant $K_C$ of the roll restraining spring 152 has a value corresponding to reduction amounts of the respective roll spring constants $K_f$, $K_r$ of the front-wheel-side spring 144f and the rear-wheel-side spring 144r. The roll damping coefficient $C_C$ of the roll restraining damper 154 has a value corresponding to reduction amounts of the respective roll damping constants $C_f$, $C_r$ of the front-wheel-side damper 146f and the rear-wheel-side damper 146r. The roll spring constant $K_C$ and the roll damping coefficient $C_C$ are represented by the following formulas (18) and (19), respectively:

$$K_C=(1-\alpha_{Kf})K_f+(1-\alpha_{Kr})K_r \qquad (18)$$

$$C_C=(1-\alpha_{Cf})C_f+(1-\alpha_{Cr})C_r \qquad (19)$$

In other words, the roll restraining spring 152 and the roll restraining damper 154 may be considered to have a function of supplementing a reduction in the damping ability for damping the roll of the vehicle body due to the reduction in the roll-causing force, in accordance with the reduction force. Owing to this function, the roll generated in the vehicle body can be effectively damped.

In the roll-causing-force-reduction-type roll restraining control, there is determined the roll restraining force F to be generated by the front-wheel-side and the rear-wheel-side stabilizer devices 14, namely, the target road-surface-unevenness-dependent-roll restraining force $F_U$ in the roll-causing-force-reduction-type roll restraining control, by comparing the above formula (17) relating to the roll-causing-force reduction model and the above formula (4) relating to the real-device model. This target road-surface-unevenness-dependent-roll restraining force $F_U$ may be called a roll-causing-force-reduction-type roll restraining-force $F_R$ and is represented by the following formula (20):

$$F_R = K_{Sf}D_f + K_{Sr}D_r \quad (20)$$
$$= -[(1-a_{Cf})C_f s + (1-a_{Kf}K_f)]X_f -$$
$$[(1-a_{Cr})C_r s + (1-a_{Kr}K_r)]X_r$$

iii-b) Two Methods of Estimating Unsprung-Portion Relative Displacement Amount

As apparent from the above formula (20), it is needed to estimate the relative displacement amount $X_f$ of the front-wheel-side unsprung portions and the relative displacement amount $X_r$ of the rear-wheel-side unsprung portions, in determining the roll-causing-force-reduction-type roll restraining-force $F_R$. The estimation of the relative displacement amounts $X_f$, $X_r$ of the front-wheel-side unsprung portions and the rear-wheel-side unsprung portions in the roll-causing-force-reduction-type roll restraining control of the present system 10 are conducted by any one of the following two mutually different methods.

In a first estimating method as one of the two methods, the estimation is conducted according to the roll-causing-force reduction model on the basis of the front-wheel-side relative stroke amount $S_{Tf}$. As in the skyhook-type roll restraining control, in the estimation, the correction according to the above formula (14) for excluding the restrained relative stroke amount $\Delta S_T$ is conducted on the relative stroke amount $S_{Tf}$ measured based on the detected values of the two stroke sensors 112. Further, the estimation on the basis of the displacement delay coefficient $e^{-\tau S}$ of the rear-wheel-side unsprung portions, namely, the estimation of the relative displacement amount $X_r$ of the rear-wheel-side unsprung portions according to the above formula (8), is utilized. In the first estimating method, the relative displacement amounts $X_f$, $X_r$ of the front-wheel-side unsprung portions and the rear-wheel-side unsprung portions are respectively estimated according to the following formulas (21) and (22):

$$X_f = S_{Tf}[I s^2 + (C_f + C_r)s + (K_f + K_r)]/B \quad (21)$$

$$[B = Is^2 + (1-\alpha_{Cf})C_f s + (1-\alpha_{Cr}e^{-\tau S})C_r s + (1-\alpha_{Kf})K_f + (1-\alpha_{Kr}e^{-\tau S})K_r]$$

$$X_r = X_f e^{-\tau S} \quad (22)$$

In a second estimating method as the other of the two methods, the estimation is conducted according to the roll-causing-force reduction model on the basis of the roll amount X of the vehicle body. The roll amount X of the vehicle body utilized in this estimation is a measured value and obtained from the detected values of vertical acceleration $G_{XL}$, $G_{XR}$ at the respective specific positions of the left and right portions of the vehicle body detected by the respective two vertical-acceleration sensors 114, namely, the detected values of the vertical acceleration $G_{XL}$, $G_{XR}$ of the respective left and right sprung portions. In this second estimating method, correction of the measured roll amount X of the vehicle body is also conducted for excluding the influence of the vehicle-turning-dependent-roll restraining control. More specifically, on the basis of the target vehicle-turning-dependent-roll restraining force $F_T$ that is currently being generated, the restrained roll amount $\Delta X$ is obtained referring to the map for the vehicle-turning-dependent-roll restraining force explained above, and correction for excluding the restrained roll amount $\Delta X$ is conducted according to the following formula (23):

$$X = X - \Delta X \quad (23)$$

As in the above-indicated first estimating method, the estimation on the basis of the displacement delay coefficient $e^{-\tau S}$ of the rear-wheel-side unsprung portions, namely, the estimation of the relative displacement amount $X_r$ of the rear-wheel-side unsprung portions according to the above formula (8), is utilized in the second estimating method. In the second estimating method, the relative displacement amounts $X_f$, $X_r$ of the front-wheel-side unsprung portions and the rear-wheel-side unsprung portions are respectively estimated according to the following formulas (24) and (25):

$$X_f = X[Is^2 + (C_f + C_r)s + (K_f + K_r)]/[(\alpha_{Cf}C_f s + \alpha_{Kf}K_f) + (\alpha_{Cr}C_r s + \alpha_{Kr}K_r)e^{-\tau S}] \quad (24)$$

$$X_r = X_f e^{-\tau S} \quad (25)$$

In the roll-causing-force-reduction-type roll restraining control, the above-indicated first and second estimating methods are selectively employed. In the estimation of the relative displacement amount $X_r$ of the rear-wheel-side unsprung portions, the approximation formula according to the above fumula (9) is used. For reasons of estimation accuracy using the approximation formula, and so on, the estimation accuracy of the relative displacement amounts $X_f$, $X_r$ according to the first estimating method is inevitably lowered when the vehicle is running at a low speed. In the light of this, in the roll-causing-force-reduction-type roll restraining control, the estimation according to the second estimating method is conducted where the vehicle speed v is not higher than a preset threshold speed $v_0$ and the estimation according to the first estimating method is conducted where the vehicle speed v is higher than the threshold speed $v_0$. In the present system 10, the threshold speed $v_0$ is set at 20 km/h. In either of the first and second estimating methods, the relative displacement amounts $X_f$, $X_r$ of the front-wheel-side unsprung portions and the rear-wheel-side unsprung portions are estimated, and the roll-causing-force-reduction-type roll restraining-force $F_R$ is determined according to the above formula (20) on the basis of the estimated the relative displacement amounts $X_f$, $X_r$.

iii) Changing of Reduction Ratio of Roll-Causing Force

There will be next explained setting of the reduction ratio of the roll-causing force, namely, setting of the above-described roll-causing force reduction gain. In the roll-causing-force reduction model, the roll-causing force is a force generated by the front-wheel-side and rear-wheel-side relative-stroke-relation springs 144f, 144r and the front-wheel-side and rear-wheel-side relative-stroke-relation dampers 146f, 146r while relying on the relative displacements of the left and right unsprung portions on the front wheel side and on the rear wheel side. More specifically, the force is indicated by the right-hand side of each of the above formulas (16) and (17), and a front-wheel-side roll-causing force $F_{Ef}$ and the rear-wheel-side roll-causing force $F_{Er}$ are respectively represented by the following formulas (26), (27) and are synthetically represented as $F_E$ according to the formula (28):

$$F_{Ef} = (\alpha_{Cf}C_f s + \alpha_{Kf}K_f)X_f \quad (26)$$

$$F_{Er} = (\alpha_{Cr}C_r s + \alpha_{Kr}K_r)X_r \quad (27)$$

$$F_E = (\alpha_C C s + \alpha_K K)X \quad (28)$$

As apparent from the above formula (28), "($\alpha_C$Cs X)" is a damper roll-causing force and "($\alpha_K$KX)" is a spring roll-causing force.

Figure 8:
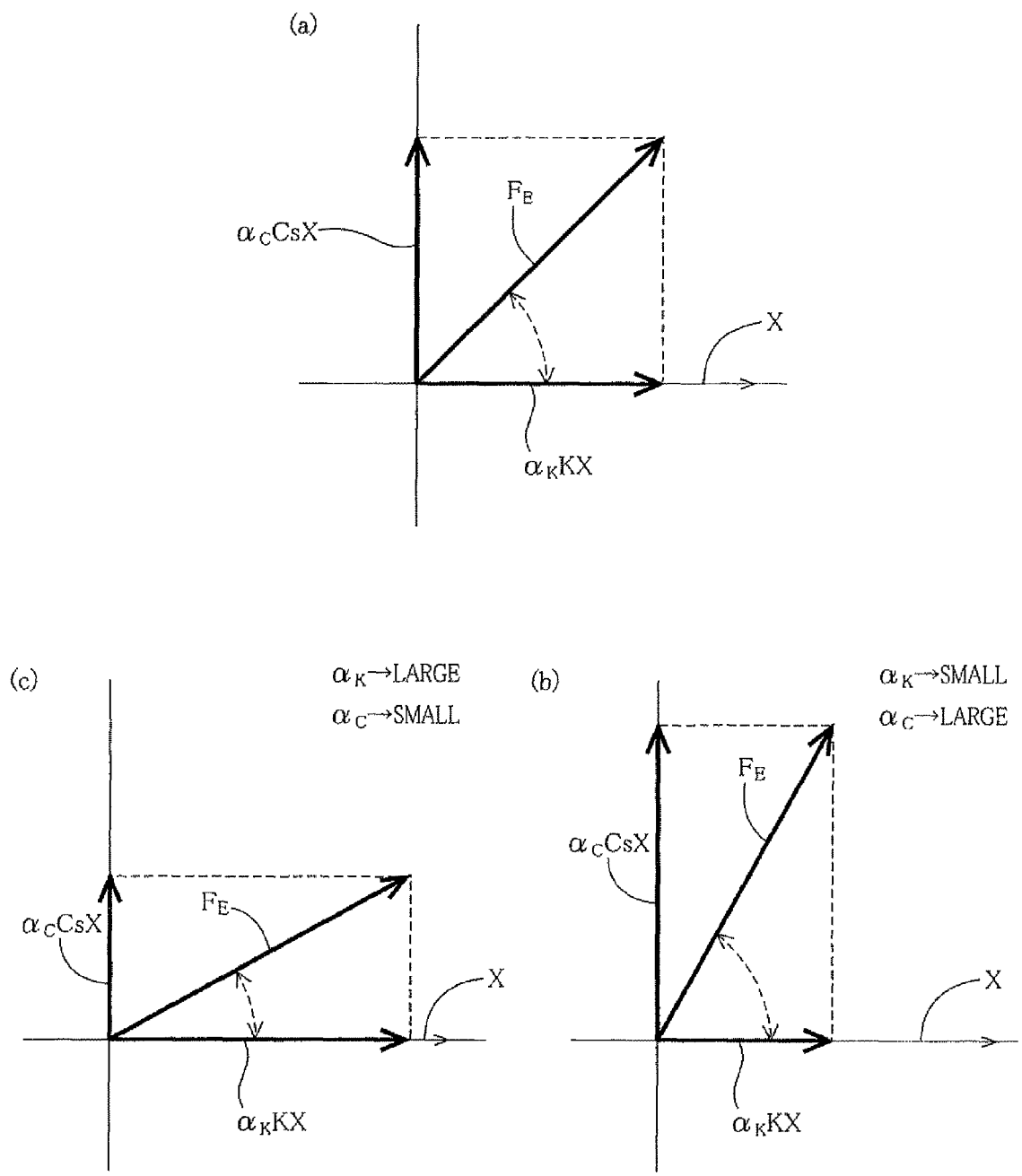
FIG. 8 is a conceptual view for explaining a manner of setting a roll-causing-force reduction gain used in the control according to the model of FIG. 7.

FIG. 8 is a conceptual view for explaining the phase of the roll-causing force $F_E$ where the relative displacement of the unsprung portions and the roll of the vehicle body are considered as a vibration. As shown in FIG. 8(a), the phase of the spring roll-causing force (represented as a vector ($\alpha_K$KX) for convenience) coincides with the phase of the relative displacement of the unsprung portions (represented as a vector X for convenience). The phase of the damper roll-causing force (represented as a vector ($\alpha_C$CsX) for convenience) is ahead by 90° with respect to the phase of the relative displacement of the unsprung portions. Since the roll-causing force $F_E$ is a composite force of the spring roll-causing force and the damper roll-causing force, the phase of the roll-causing force $F_E$ can be changed by changing the reduction ratio (1−α) of each of the spring roll-causing force and the damper roll-causing force, namely, by changing the above-described roll-causing-force reduction gain α.

To be more specific, the phase of the roll-causing force $F_E$ becomes more ahead with respect to the phase of the relative displacement X of the unsprung portions by increasing the reduction ratio (1−$\alpha_K$) of the spring roll-causing force with respect to the reduction ratio (1−$\alpha_C$) of the damper roll-causing force, namely, by decreasing the roll-causing-force reduction gain $\alpha_K$ of the spring roll-causing force with respect to the roll-causing-force reduction gain ac of the damper roll-causing force, as shown in FIG. 8(b). On the other hand, the phase of the roll-causing force $F_E$ becomes close to the phase of the relative displacement X of the unsprung portions by increasing the reduction ratio (1−$\alpha_C$) of the damper roll-causing force with respect to the reduction ratio (1−$\alpha_K$) of the spring roll-causing force, namely, by decreasing the roll-causing-force reduction gain $\alpha_C$ of the damper roll-causing force with respect to the roll-causing-force reduction gain $\alpha_K$ of the spring roll-causing force, as shown in FIG. 8(c).

In an instance where both of the front-wheel side and the rear-wheel side are taken into consideration, the phase of the relative displacement amount $X_r$ of the rear-wheel-side unsprung portions is delayed with respect to the phase of the relative displacement amount $X_f$ of the front-wheel-side unsprung portions, as explained above. That is, the displacement delay of the rear-wheel-side unsprung portions shown in the above formula (8) (the coefficient $e^{-\tau s}$) is generated. The delay is dependent on the vibration frequency of the relative displacement X of the unsprung portions and is also dependent on the vehicle speed v and the tread T. In the meantime, the roll vibration frequency is about 2 Hz in the vehicle on which the present system 10 is mounted, and it is a primary object, in the road-surface-unevenness-dependent-roll restraining control, to effectively restrain the roll vibration at and around the frequency. In view of this, where the relative displacement X of the unsprung portions having the vibration frequency of 2 Hz is considered, the phase of the relative displacement amount $X_r$ of the rear-wheel-side unsprung portions is delayed by about 90° with respect to the phase of the relative displacement amount $X_f$ of the front-wheel-side unsprung portions when the vehicle speed is 90 km/h, and is delayed by about 270° when the vehicle speed is 30 km/h.

The overall roll-causing force $F_E$ is a composite force of the front-wheel-side roll-causing force $F_{Ef}$ and the rear-wheel-side roll-causing force $F_{Er}$, and it is an object in the roll-causing-force-reduction-type roll restraining control to reduce the overall roll-causing force $F_E$. In the light of this, it is desirable to change the roll-causing-force reduction gain α depending upon the vehicle speed v More specifically, with reference to FIG. 9, where the vehicle speed is 90 km/h, the overall roll-causing force $F_E$ is smaller in a situation (shown in FIG. 9(b)) in which the front-wheel-side spring gain $\alpha_{Kf}$ is small, the front-wheel-side damper gain $\alpha_{Cf}$ is large, the rear-wheel-side spring gain $\alpha_{Kr}$ is large, and the rear-wheel-side damper gain $\alpha_{Cr}$ is small than in a situation (shown in FIG. 9(a)) in which the front-wheel-side spring gain $\alpha_{Kf}$ is large, the front-wheel-side damper gain $\alpha_{Cf}$ is small, the rear-wheel-side spring gain $\alpha_{Kr}$ is small, and the rear-wheel-side damper gain $\alpha_{Cr}$ is large. On the contrary, where the vehicle speed is 30 km/h, the overall roll-causing force $F_E$ is smaller in a situation (shown in FIG. 9(d)) in which the front-wheel-side spring gain $\alpha_{Kf}$ is large, the front-wheel-side damper gain $\alpha_{Cf}$ is small, the rear-wheel-side spring gain $\alpha_{Kr}$ is small, and the rear-wheel-side damper gain $\alpha_{Cr}$ is large than in a situation (shown in FIG. 9(c)) in which the front-wheel-side spring gain $\alpha_{Kf}$ is small, the front-wheel-side damper gain $\alpha_{Cf}$ is large, the rear-wheel-side spring gain $\alpha_{Kr}$ is large, and the rear-wheel-side damper gain $\alpha_{Cr}$ is small.

Accordingly, it is generally desirable to make the front-wheel-side spring gain $\alpha_{Kf}$ small, make the front-wheel-side damper gain $\alpha_{Cf}$ large, make the rear-wheel-side spring gain $\alpha_{Kr}$ large, and make the rear-wheel-side damper gain $\alpha_{Cr}$ small in an instance where the vehicle speed v is high, as compared in an instance where the vehicle speed v is low. In other words, it is desirable to make the reduction ratio (1−$\alpha_{Kf}$) of the front-wheel-side spring roll-causing force large, make the reduction ratio (1−$\alpha_{Cf}$) of the front-wheel-side damper roll-causing force small, make the reduction ratio (1−$\alpha_{Kr}$) of the rear-wheel-side spring roll-causing force small, and make the reduction ratio (1−$\alpha_{Cr}$) of the rear-wheel-side damper roll-causing force large.

In the meantime, in the above-described roll-causing-force reduction model, there exists a certain degree of time lag, namely, a delay in application of the roll-causing force (i.e., application delay) until the roll-causing force is applied to the vehicle body by the relative-stroke-relation spring 144 and the relative-stroke-relation damper 146 after the relative displacement of the unsprung portions has been generated due to the unevenness of the road surface. This delay leads to a delay in the force for restraining the roll by the roll restraining spring 152 and the roll restraining damper 154. Further, the application delay of the roll-causing force increases with a reduction in the roll-causing force. Therefore, where the above-described displacement delay of the rear-wheel-side unsprung portions is taken into consideration, it is desirable not to reduce the front-wheel-side roll-causing force $F_{Ef}$, but to largely reduce the rear-wheel-side roll-causing force $F_{Er}$ instead. By thus setting the roll-causing-force reduction gain α, it is possible to apply, to the vehicle body, the force by the roll restraining spring 152 and the roll restraining damper 154, at a comparatively early stage of the relative displacement of the front-wheel-side unsprung portions while comparatively largely preceding the relative displacement of the rear-wheel-side unsprung portions.

The deterioration of the control responsiveness due to the above-described application delay of the roll-causing force is comparatively prominent in a situation in which the vehicle speed is lower than a certain speed. In the roll-causing-force-reduction-type roll restraining control, therefore, the value of the front-wheel-side spring gain $\alpha_{Kf}$ and the value of the front-wheel-side damper gain $\alpha_{Cf}$ are set at "1" (the reduction ratio: 0) while the value of the rear-wheel-side spring gain $\alpha_{Kr}$ and the value of the rear-wheel-side damper gain $\alpha_{Cr}$ are set at "0" (the reduction ratio: 1), where the vehicle speed is lower than the above-indicated threshold speed $v_0$ (i.e., 20 km/h). In other words, in the thus set roll-causing-force reduction model, the front-wheel-side roll-causing force $F_{Ef}$ is not reduced and the rear-wheel-side roll-causing force $F_{Er}$ is not generated. In addition, the roll-causing-force-reduction-type roll restraining control in which such a roll-causing-force reduction model is employed may be regarded as a control specialized for the rear-wheel side.

Figure 10:
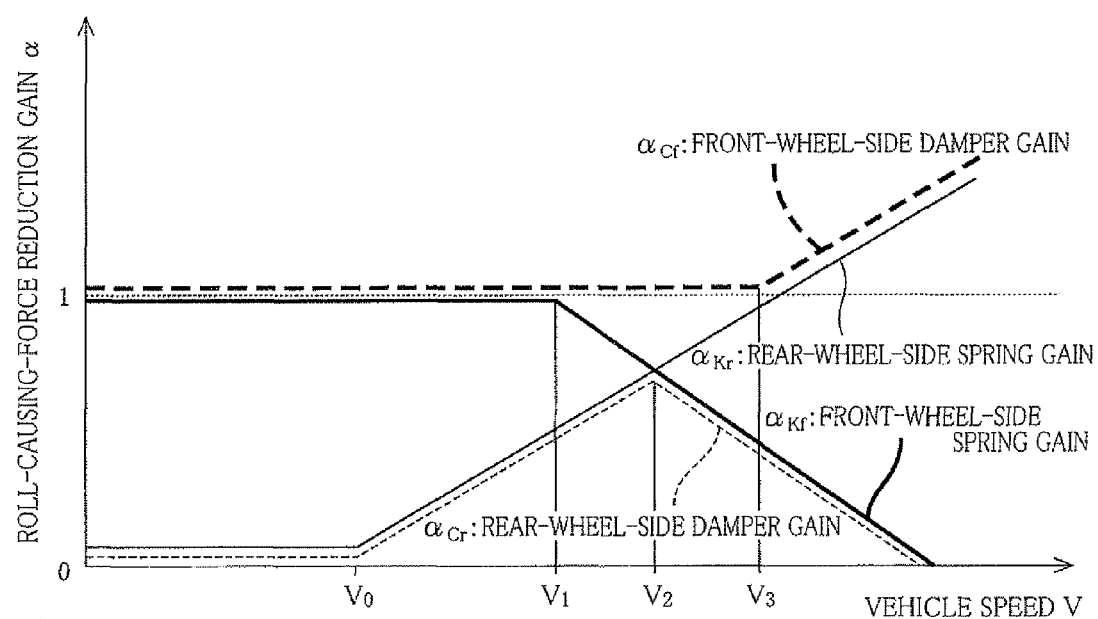
FIG. 10 is a graph showing map data for setting the roll-causing-force reduction gain used in the control according to the model of FIG. 7.

In the light of the above, in the present roll-causing-force-reduction-type roll restraining control, the roll-causing-force reduction gains, $\alpha_{Kf}$, $\alpha_{Cf}$, $\alpha_{Kr}$, $\alpha_{Cr}$ are changed depending upon the vehicle speed v, as shown in FIG. 10. More specifically, where the vehicle speed is not higher than the threshold speed $v_0$, the value of the front-wheel-side spring gain $\alpha_{Kf}$ and the value of the front-wheel-side damper gain $\alpha_{Cf}$ are both set at "1" while the value of the rear-wheel-side spring gain $\alpha_{Kr}$ and the value of the rear-wheel-side damper gain $\alpha_{Cr}$ are both set at "0". Where the vehicle speed is higher than the threshold speed $v_0$, the value of the rear-wheel-side spring gain $\alpha_{Kr}$ and the value of the rear-wheel-side damper gain $\alpha_{Cr}$ are increased with an increase in the vehicle speed v. In an instance where the vehicle speed v becomes not lower than a threshold speed $v_1$, the value of the front-wheel-side spring gain $\alpha_{Kf}$ is decreased with an increase in the vehicle speed v. In an instance where the vehicle speed v becomes not lower than a threshold speed $v_2$, the value of the rear-wheel-side damper gain $\alpha_{Cr}$ which has been increased in accordance with the vehicle speed v is decreased with an increase in the vehicle speed v. In an instance where the vehicle speed v becomes not lower than a threshold speed $v_3$, the value of the front-wheel-side damper gain $\alpha_{Cf}$ is increased with an increase in the vehicle speed v. The changing of the roll-causing-force reduction gains $\alpha$ is conducted such that the value of each gain is continuously changed. Further, the front-wheel-side damper gain $\alpha_{Cf}$ and the rear-wheel-side spring gain $\alpha_{Kr}$ are changed so as to exceed "1" where the vehicle speed v becomes high to a certain extent. The relationship indicated in FIG. 10 is stored in the controller 96 as a roll-causing-force-reduction-gain changing map.

(iv) Selection and Weighting of Two Sorts of Controls

In the road-surface-unevenness-dependent-roll restraining control, the above-described two sorts of controls, namely, the skyhook-type roll restraining control and the roll-causing-force-reduction-type roll restraining control are selectively or concurrently executed depending upon situations.

Where the vehicle is running at a low speed, the estimation accuracy of the displacement delay of the rear-wheel-side unsprung portions according to the formula (9) is comparatively low. Further, as explained above, the responsiveness of the road-surface-unevenness-dependent-roll restraining control can be expected to be improved if there is executed the roll-causing-force-reduction-type roll restraining control in which the front-wheel-side spring gain am and the front-wheel-side damper gain $\alpha_{Cf}$ are set at "1" while the rear-wheel-side spring gain $\alpha_{Kr}$ and the rear-wheel-side damper gain $\alpha_{Cr}$ are set at "0", namely, if the roll-causing-force-reduction-type roll restraining control specialized for the rear-wheel side is executed in the low-speed running range of the vehicle. In view of the above, in the present road-surface-unevenness-dependent-roll restraining control, where the vehicle speed v is not higher than the threshold speed $v_0$ (i.e., 20 km/h), the roll-causing-force-reduction-type roll restraining control specialized for the rear-wheel side is executed and the skyhook-type roll restraining control is not executed. Accordingly, as shown in the following formula (29), the roll-causing-force-reduction-type roll restraining force $F_R$ determined according to the formula (20) is made equal to the target road-surface-unevenness-dependent-roll restraining force $F_U$ to be generated by the front-wheel-side and the rear-wheel-side stabilizer devices 14 in the present road-surface-unevenness-dependent-roll restraining control:

$$F_U = F_R \quad (29)$$

On the other hand, even where the vehicle is running at a high speed, the determination accuracy of the roll restraining force to be generated by the stabilizer device 14 becomes comparatively low because the accuracy of estimation of the displacement delay of the rear-wheel-side unsprung portions is comparatively low for the relative displacement vibration of the unsprung portions and the roll vibration in a comparatively high frequency range. In view of this, in the present road-surface-unevenness-dependent-roll restraining control, where the vehicle speed v exceeds the threshold speed $v_0$, the two sorts of the controls are concurrently executed by conducting weighting in accordance with the frequency of the roll vibration that is occurring.

More specifically, the state of the roll vibration that is occurring is estimated on the basis of the detection values of the vertical acceleration $G_{XL}$, $G_{XR}$ by the pair of vertical-acceleration sensors 114. By performing filtering processing on the estimation result, the high-frequency component and the low-frequency component of the roll vibration are identified. To be more specific, the low-frequency component is identified by high-cut filer processing of cutting the vibration whose frequency exceeds 2 Hz while the high-frequency component is identified by low-cut filer processing of cutting the vibration whose frequency is not larger than 2 Hz, whereby the intensity such as the amplitude of each of the components can be obtained. On the basis of the thus obtained intensity $I_L$ of the low-frequency vibration component and intensity $I_H$ of the high-frequency vibration component, the skyhook-type roll restraining force $F_S$ and the roll-causing-force-reduction-type roll restraining force $F_R$ are summed after having been weighted, according to the following formula (30). This weighted sum is the target road-surface-unevenness-dependent-roll restraining force $F_U$ to be generated by the front-wheel-side and the rear-wheel-side stabilizer devices 14 in the road-surface-unevenness-dependent-roll restraining control. In this respect, each of "$I_L/(I_L+I_H)$" and "$I_H/(I_L+I_H)$" has a function as a weighting coefficient:

$$F_U = F_R I_L/(I_L+I_H) + F_S I_H/(I_L+I_H) \quad (30)$$

$I_L$: intensity of low-frequency vibration component
$I_H$: intensity of high-frequency vibration component Consequently, in an instance where the vehicle running speed exceeds the threshold speed $v_0$, the road-surface-unevenness-dependent-roll restraining control in which the skyhook-type roll restraining control is emphasized is executed when the high-frequency vibration component is relatively large while the road-surface-unevenness-dependent-roll restraining control in which the roll-causing-force-reduction-type roll restraining control is emphasized is executed when the low-frequency vibration component is relatively large.

(c) Synthesis of the Two Roll Restraining Controls and Control of Operation of Stabilizer Device The target vehicle-turning-dependent-roll restraining force $F_T$ and the target road-surface-unevenness-dependent-roll restraining force $F_U$ determined as described above are simply summed as indicated by the following formula (31). The sum is a target roll restraining force $F^*$ as the roll restraining force to be generated by the front-wheel-side and the rear-wheel-side stabilizer devices 14 in the roll restraining control in which the vehicle-turning-dependent-roll restraining control and the road-surface-unevenness-dependent-roll restraining control are synthesized.

$$F^* = F_T + F_U \quad (31)$$

The target roll restraining force F* determined as described above is distributed into a target front-wheel-side device-individualized roll restraining force $F_{Df}$ and a target rear-wheel-side device-individualized roll restraining force $F_{Dr}$ according to the following formulas (32) and (33), on the basis of a suitable roll-stiffness distribution coefficient β. The target front-wheel-side device-individualized roll restraining force $F_{Df}$ and the target rear-wheel-side device-individualized roll restraining force $F_{Dr}$ are the target device-individualized roll restraining forces $F_D$ of the front-wheel-side stabilizer device 14f and the rear-wheel-side stabilizer device 14r, respectively.

$$F_{Df} = \beta F^* \quad (32)$$

$$F_{Dr} = (1-\beta) F^* \quad (33)$$

As apparent from the above formulas (32) and (33), "β:(1−β)" is a predetermined distribution ratio for distributing the target roll restraining force F* into the front-wheel-side stabilizer device 14f and the rear-wheel-side stabilizer device 14r.

However, one of the target front-wheel-side device-individualized roll restraining force $F_{Df}$ and the target rear-wheel-side device-individualized roll restraining force $F_{Dr}$ exceeds a threshold roll restraining force $F_{MAX}$, it is judged that one of the front-wheel-side stabilizer device 14f and the rear-wheel-side stabilizer device 14r that corresponds to the one of the target front-wheel-side device-individualized roll restraining force $F_{Df}$ and the target rear-wheel-side device-individualized roll restraining force $F_{Dr}$ is suffering from a load. On the basis of the judgment, the roll-stiffness distribution coefficient β is changed into an adjusted roll-stiffness distribution coefficient β', and the target front-wheel-side device-individualized roll restraining force $F_{Df}$ and the target rear-wheel-side device-individualized roll restraining force $F_{Dr}$ are adjusted according to the above formulas (32) and (33), on the basis of the adjusted roll-stiffness distribution coefficient β'. In other words, the above-described distribution ratio is changed.

More specifically, when the distribution on the basis of the adjusted roll-stiffness distribution coefficient β' is conducted, the one of the target front-wheel-side device-individualized roll restraining force $F_{Df}$ and the target rear-wheel-side device-individualized roll restraining force $F_{Dr}$ that exceeds the threshold roll restraining force $F_{MAX}$ is made as the threshold roll restraining force $F_{MAX}$. The other of the target front-wheel-side device-individualized roll restraining force $F_{Df}$ and the target rear-wheel-side device-individualized roll restraining force $F_{Dr}$ has a magnitude in which is added a difference ΔF between: the one of the target front-wheel-side device-individualized roll restraining force $F_{Df}$ and the target rear-wheel-side device-individualized roll restraining force $F_D$; and the threshold roll restraining force $F_{MAX}$. In this instance, where the other of the force $F_{Df}$ and the force $F_{Dr}$ exceeds the threshold roll restraining force $F_{MAX}$, the other of the force $F_{Df}$ and the force $F_{Dr}$ is made as the threshold roll restraining force $F_{MAX}$. In other words, the value of the adjusted roll-stiffness distribution coefficient β' is changed such that both of the target front-wheel-side device-individualized roll restraining force $F_{Df}$ and the target rear-wheel-side device-individualized roll restraining force $F_{Dr}$ do not exceed the threshold roll restraining force $F_{MAX}$.

Strictly, the load on the stabilizer device 14 should be judged based on the above-described sum of the basic roll restraining force ($K_S S_T$) and the control roll restraining force ($K_S D$). In most instances, however, the sum increases with an increase in the control roll restraining force ($K_S D$). In the roll restraining control of the present system 10, therefore, the load on the stabilizer device 14 is judged utilizing the target device-individualized roll restraining forces $F_D$ that is the control roll restraining force ($K_S D$), in terms of simplification of the control processing.

On the basis of the target front-wheel-side device-individualized roll restraining force $F_{Df}$ and the target rear-wheel-side device-individualized roll restraining force $F_{Dr}$ determined as described above or adjusted as described above after having been determined, the operation of each of the front-side and the rear-side stabilizer devices 14 is controlled. Initially, there are determined an operational amount $D_f$ of the front-wheel-side stabilizer device 14f and an operational amount $D_r$ of the rear-wheel-side stabilizer device 14r according to the following formulas (34) and (35), respectively:

$$D_f = F_{Df} / K_{Sf} \quad (34)$$

$$D_r = F_{Dr} / K_{Sr} \quad (35)$$

On the basis of the thus determined operational amounts $D_f$ and $D_r$, there are determined a target operational amount $A_f^*$ of the actuator 26 of the front-wheel-side stabilizer device 14f and a target operational amount $A_r^*$ of the actuator 26 of the rear-wheel-side stabilizer device 14r according to the following formulas (36) and (37), respectively. In this respect, "R" and "$L_A$" represent a lever ratio of the second lower arm 38 and a length of the arm portion 52 of the stabilizer bar member 20, respectively.

$$A_f^* = D_f R / L_A \quad (36)$$

$$A_r^* = D_r R / L_A \quad (37)$$

On the basis of the thus determined target operational amounts $A_f^*$, $A_r^*$, the operations of the actuators 26 of the respective front-wheel-side and rear-wheel-side stabilizer devices 14 are controlled. The operational amount A of the actuator 26 and the motor rotational angle θ of the electric motor 60 are correlated with each other by the reduction ratio of the decelerator 62. Accordingly, the control of the operation of the actuator 26 is carried out based on the motor rotational angle θ. Initially, on the basis of the target operational amounts $A_f^*$, $A_r^*$ of the respective actuators 26, there are determined target motor rotational angles $\theta_f^*$, $\theta_r^*$ each as a target of each motor 60. Since actual motor rotational angles $\theta_f$, $\theta_r$ of the respective motors 60 have been detected by the respective motor-rotational-angle sensors 78, the electric motors 60 are controlled such that the actual motor rotational angles $\theta_f$, $\theta_r$ of the respective motors 60 coincide with the respective target motor rotational angles $\theta_f^*$, $\theta_r^*$.

Each electric motor 60 is controlled such that a supply current to be supplied to the motor 60 is first determined and then the determined supply current is supplied to the motor 60. The supply current is determined on the basis of motor-rotational-angle deviations $\Delta\theta_f$, $\Delta\theta_r$ (=$\theta^* - \theta$) which are deviations of the actual motor rotational angles $\theta_f$, $\theta_r$ of the respective motors 60 from the target motor rotational angles $\theta_f^*$, $\theta_r^*$. More specifically, the supply current to be supplied to each motor 60 is determined according to a feedback control technique based on the motor-rotational-angle deviation Δθ. That is, the motor-rotational-angle deviations $\Delta\theta_f$, $\Delta\theta_r$ are initially identified based on the values detected by the motor-rotational-angle sensors 78 of the respective motors 60. Subsequently, target supply currents $i_f^*$, $i_r^*$ for the respective motors 60 are determined utilizing the motor-rotational-angle deviations $\Delta\theta_f$, $\Delta\theta_r$ each as a parameter, according to the following formulas (38) and (39):

$$i_f^* = \gamma_P \Delta\theta_f + \gamma_I I_{nt}(\Delta\theta_f) \quad (38)$$

$$i_r^* = \gamma_P \Delta\theta_r + \gamma_I I_{nt}(\Delta\theta_r) \quad (39)$$

$\Delta\theta_f$, $\Delta\theta_r$: motor-rotational-angle deviation
$I_{nt}(\Delta\theta_f)$, $I_{nt}(\Delta\theta_r)$: time integral of deviation
$\gamma_P$: proportional-term gain
$\gamma_I$: integral-term gain Each of the above-indicated formulas is according to a PI control rule. The first term and the second term in each formula respectively mean a proportional-term component and an integral-term component of the target supply current i*, with respect to the motor-rotational-angle deviation $\Delta\theta$. The thus determined supply current is supplied to the electric motor 60, whereby the stabilizer device 14 generates an appropriate target roll restraining force F*.

<Functional Structure of Control Device>

The roll restraining control in the present system 10 is executed such that the controller 96 of the ECU 90 as a control device implements a suitable roll-restraining control program. By implementation of the program, the controller 96 has a plurality of functional portions arranged to execute various processing assigned thereto. Hereinafter, the functional portions of the controller 96 and the processing executed by the functional portions will be explained while referring to the above explanation of the roll restraining control.

As shown in FIG. 11, the controller 96 includes, as two roll-restraining-force determining portions, a vehicle-turning-dependent-roll-restraining-force determining portion 200 and a road-surface-unevenness-dependent-roll-restraining-force determining portion 202. The vehicle-turning-dependent-roll-restraining-force determining portion 200 determines the target vehicle-turning-dependent-roll restraining force $F_T$ by executing the processing explained above on the basis of the operational angle $\delta$ of the steering wheel, the vehicle speed v, and the actual lateral acceleration $G_{Yr}$. The road-surface-unevenness-dependent-roll-restraining-force determining portion 202 determines the target road-surface-unevenness-dependent-roll restraining force $F_U$ on the basis of the measured front-wheel-side relative stroke amount $S_{Tf}$ or the roll amount X of the vehicle body. The details of the determining portion 202 will be explained in detail.

The front-wheel-side relative stroke amount $S_{Tf}$ is calculated by a relative-stroke-amount calculating portion 204 on the basis of the front-wheel-side left and right stroke amounts $S_{Lf}$, $S_{Lr}$ detected by the respective stroke sensors 112 and is inputted to the road-surface-unevenness-dependent-roll-restraining-force determining portion 202 from the calculating portion 204. The roll amount X of the vehicle body is calculated by a body-roll-amount calculating portion 206 on the basis of the vertical acceleration $G_{XL}$, $G_{XR}$ at the prescribed positions of the left and right portions of the vehicle body measured by the respective vertical-acceleration sensors 114 and is inputted to the road-surface-unevenness-dependent-roll-restraining-force determining portion 202 from the calculating portion 206. Further, for excluding the influence of the vehicle-turning-dependent-roll restraining control when determining the target road-surface-unevenness-dependent-roll restraining force $F_U$, a turning-dependent-restrained-amount identifying portion 208 identifies the restrained relative stroke amount $\Delta S_T$ and the restrained roll amount $\Delta X$ on the basis of the target vehicle-turning-dependent-roll restraining force $F_T$. The restrained relative stroke amount $\Delta S_T$ and the restrained roll amount $\Delta X$ are inputted to the road-surface-unevenness-dependent-roll-restraining-force determining portion 202 from the turning-dependent-restrained-amount identifying portion 208.

In the controller 96, the target vehicle-turning-dependent-roll restraining force $F_T$ and the target road-surface-unevenness-dependent-roll restraining force $F_U$ are summed, so that the target roll restraining force F* is determined. The controller 96 has a roll-restraining-force distributing portion 210 which distributes the target roll restraining force F* into the target front-wheel-side device-individualized roll restraining force $F_{Df}$ and the target rear-wheel-side device-individualized roll restraining force $F_{Dr}$. The details of the distributing portion 210 will be explained in detail. The controller 96 further includes an operation control portion 212. The operation control portion 212 determines the target supply currents $i_f^*$, $i_r^*$ to be respectively supplied to the electric motors 60 of the respective actuators 26 of the front-wheel side and the rear-wheel-side stabilizer devices 14, on the basis of the target front-wheel-side device-individualized roll restraining force $F_{Df}$ and the target rear-wheel-side device-individualized roll restraining force $F_{Dr}$ according to the processing explained above. The operation control portion 212 sends commands as to the determined target supply currents $i_f^*$, $i_r^*$ to the respective inverters 92. The maps, data, and so on, utilized in the roll restraining control are stored in a data storage portion 214. To be more specific, the data storage portion 214 stores the map for the vehicle-turning-dependent-roll restraining force, the roll-causing-force-reduction-gain changing map as to the roll-causing-force reduction gain $\alpha$, the predetermined roll-stiffness distribution coefficient $\beta$, and so on.

Figure 12:
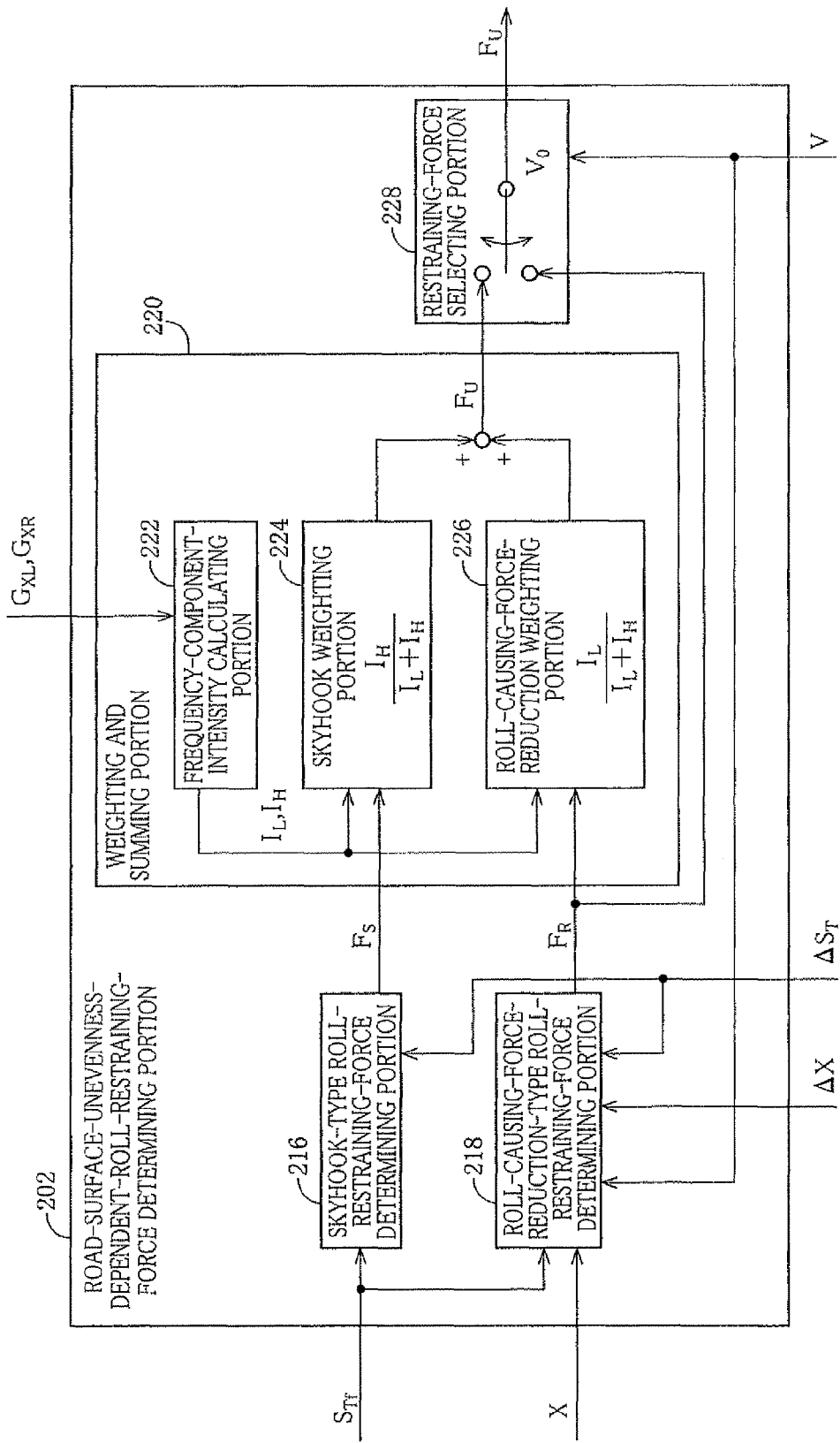
FIG. 12 is a block diagram for explaining functions of a road-surface-unevenness-dependent-roll-restraining-force determining portion of the controller of FIG. 11.

As shown in FIG. 12, the road-surface-unevenness-dependent-roll-restraining-force determining portion 202 includes, as two roll-restraining-force determining portions, a skyhook-type roll-restraining-force determining portion 216 and a roll-causing-force-reduction-type roll-restraining-force determining portion 218. While the details of those portions 216, 218 will be explained, those portions 216, 218 respectively determine the skyhook-type roll restraining force $F_S$ and the roll-causing-force-reduction-type roll restraining force $F_R$, on the basis of necessary ones of the front-wheel-side relative stroke amount $S_{Tf}$, the roll amount X of the vehicle body, the restrained relative stroke amount $\Delta S_T$, and the restrained roll amount $\Delta X$, according to the processing explained above.

The thus determined two roll restraining force $F_S$, $F_R$ are summed by a weighting and summing portion 220. As explained above, the weighting and summing portion 220 conducts weighting on the basis of the frequency component of the roll vibration. More specifically, a frequency-component-intensity calculating portion 222 obtains the intensity $I_L$ of the low-frequency vibration component and the intensity $I_H$ of the high-frequency vibration component, of the roll vibration, on the basis of the vertical acceleration $G_{XL}$, $G_{XR}$, at the prescribed positions of the left and right portions of the vehicle body. On the basis of the intensities $I_L$ and $I_H$, a skyhook weighing portion 224 and a roll-causing-force-reduction weighting portion 226 conducts weighting with respect to the skyhook-type roll restraining force $F_S$ and the roll-causing-force-reduction-type roll restraining force $F_R$, respectively. As explained above, in the weighting by the weighting portions 224, 226, the values "$I_H/(I_L+I_H)$", "$I_L/(I_L+I_H)$" each as the weighting coefficient are used.

The road-surface-unevenness-dependent-roll-restraining-force determining portion 202 includes a restraining-force selecting portion 228 which executes selection processing in which one of: (a) the summed value of the weighted and summed two roll restraining forces $F_S$ and $F_R$; and (b) the roll-causing-force-reduction-type roll restraining force $F_R$ is made as the target road-surface-unevenness-dependent-roll restraining force $F_U$. To be more specific, where the vehicle speed v is not higher than the threshold speed $v_0$, the roll-causing-force-reduction-type roll restraining force $F_R$ is made as the target road-surface-unevenness-dependent-roll restraining force $F_U$. Where the vehicle speed v exceeds the threshold speed $v_0$, the summed value of the two roll restraining forces $F_S$, $F_R$ is made as the target road-surface-unevenness-dependent-roll restraining force $F_U$. The restraining-force selecting portion 228 has a function to prevent the skyhook-type roll restraining control from being executed where the vehicle speed v is not higher than the threshold speed $v_0$.

Figure 13:
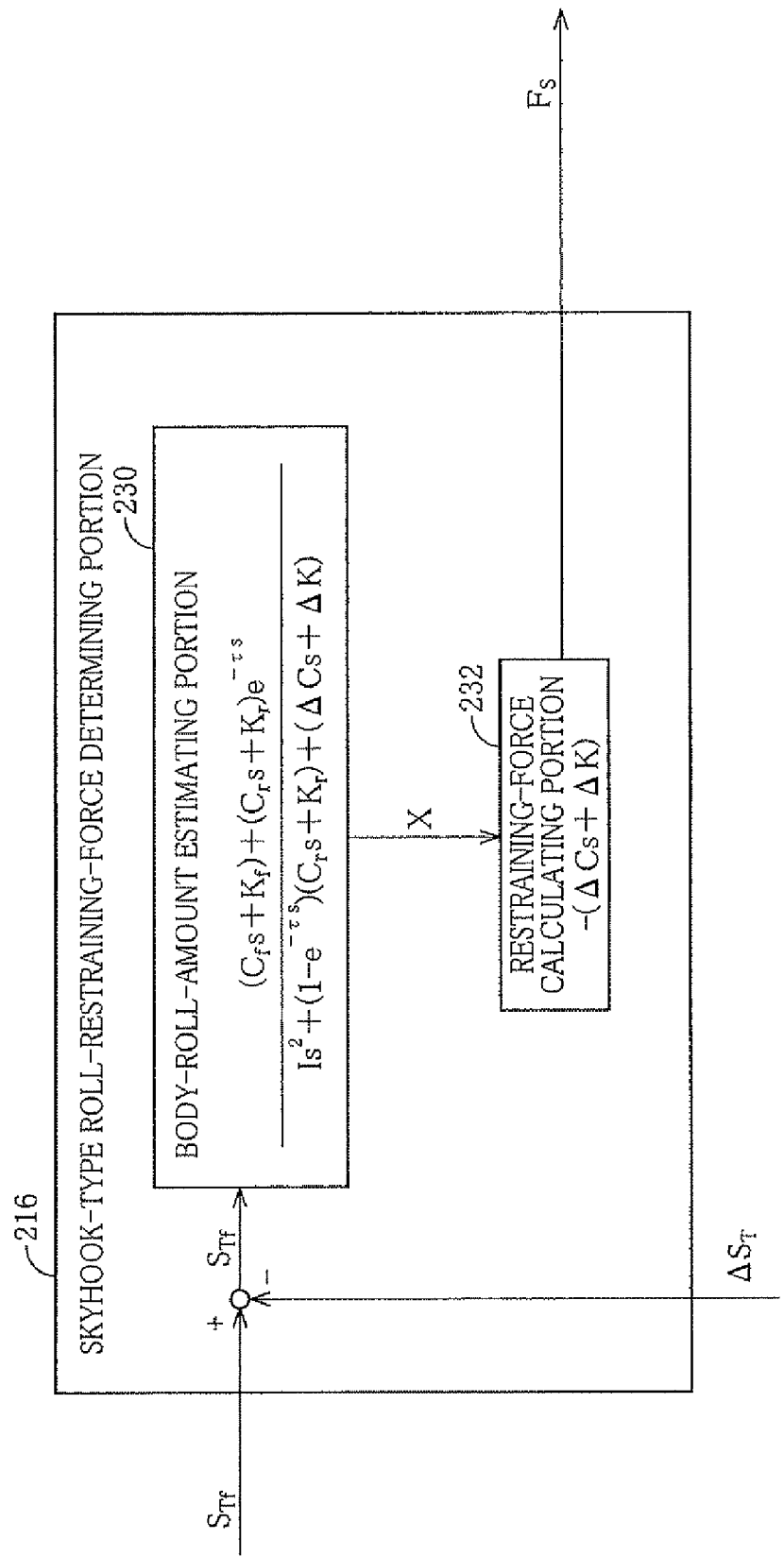
FIG. 13 is a block diagram for explaining functions of a skyhook-type roll-restraining-force determining portion of the road-surface-unevenness-dependent-roll-restraining-force determining portion of FIG. 12.

The skyhook-type roll-restraining-force determining portion 216 has a functional structure shown in FIG. 13 and estimates the roll amount X of the vehicle body and determines the skyhook-type roll restraining force $F_S$ on the basis of the estimation result, according to the skyhook model explained above. To this end, the determining portion 216 has a body-roll-amount estimating portion 230 and a restraining-force calculating portion 232. The determining portion 216 executes the correction processing in which the measured front-wheel-side relative stroke amount $S_{Tf}$ is corrected using the restrained relative stroke amount $\Delta S_T$. The body-roll-amount estimating portion 230 estimates the roll amount X of the vehicle body on the basis of the corrected front-wheel-side relative stroke amount $S_{Tf}$, according to the above-described estimation formula. The restraining-force calculating portion 232 determines the skyhook-type roll restraining force $F_S$ on the basis of the estimated roll amount X of the vehicle body, according to the above-described determination formula.

Figure 14:
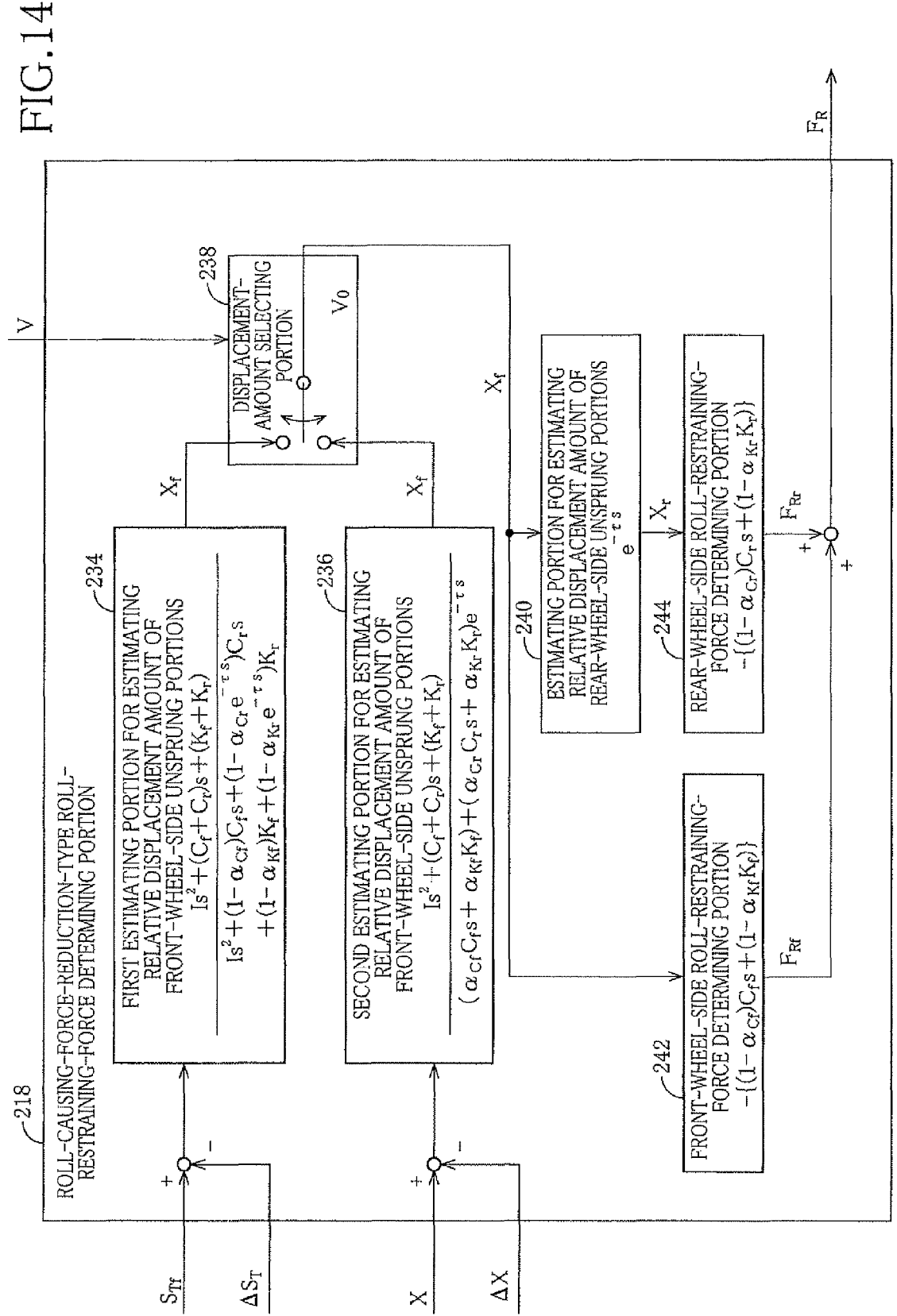
FIG. 14 is a block diagram for explaining functions of a roll-causing-force-reduction-type roll-restraining-force determining portion of the road-surface-unevenness-dependent-roll-restraining-force determining portion of FIG. 12.

The roll-causing-force-reduction-type roll-restraining-force determining portion 218 has a functional structure shown in FIG. 14. The determining portion 218 estimates the relative displacement amount $X_f$ of front-wheel-side unsprung portions and the relative displacement amount $X_r$ of rear-wheel-side unsprung portions and determines the roll-causing-force-reduction-type roll restraining force $F_R$ based on the estimation result, according to the roll-causing-force reduction model explained above. The determining portion 218 selectively uses the two methods each as the method for estimating the relative displacement amounts $X_f$, $X_r$, and includes, as two estimating portions, a first estimating portion 234 for estimating the relative displacement amount of the front-wheel-side unsprung portions and a second estimating portion 236 for estimating the relative displacement amount of the front-wheel-side unsprung portions, which correspond to the two estimating methods, respectively.

The determining portion 218 executes correction processing in which the measured front-wheel-side relative stroke amount $S_{Tf}$ is corrected using the restrained relative stroke amount $\Delta S_T$ and the roll amount X of the vehicle body is corrected using the restrained roll amount $\Delta X$. The first estimating portion 234 estimates the relative displacement amount $X_f$ of the front-wheel-side unsprung portions on the basis of the corrected front-wheel-side relative stroke amount $S_{Tf}$, according to the estimation formula in the above-described first estimating method. The second estimating portion 236 estimates the relative displacement amount $X_f$ of the front-wheel-side unsprung portions on the basis of the corrected roll amount X of the vehicle body, according to the estimation formula in the above-described second estimating method.

A displacement-amount selecting portion 238 determines which one of the relative displacement amounts $X_f$ estimated by the respective first and second estimating portions 234, 236 is employed. The selecting portion 238 selects the relative displacement amount $X_f$ estimated by the second estimating portion 236 where the vehicle speed v is not higher than the threshold speed $v_0$, and selects the relative displacement amount $X_f$ estimated by the first estimating portion 234 where the vehicle speed v exceeds the threshold speed $v_0$. An estimating portion 240 for estimating the relative displacement amount of the rear-wheel-side unsprung portions estimates the relative displacement amount $X_r$ of the rear-wheel-side unsprung portions on the basis of the selected relative displacement amount $X_f$ of the front-wheel-side unsprung portions, according to the above-indicated estimation formula. A front-wheel-side roll-restraining-force determining portion 242 and a rear-wheel-side roll-restraining-force determining portion 244 respectively determine a front-wheel-side roll restraining force $F_{Rf}$ and a rear-wheel-side roll restraining force $F_{Rr}$ on the basis of the respective estimated relative displacement amounts $X_f$, $X_r$, according to the above-indicated determination formulas. The roll restraining force $F_{Rf}$, $F_{Rr}$ are summed, so that the roll-causing-force-reduction-type roll restraining force $F_R$ is determined.

The values of the roll-causing-force reduction gain a used in the above-described estimation formulas for the relative displacement amount $X_f$ of the front-wheel-side unsprung portions are set referring to the above-described roll-causing-force-reduction-gain changing map stored in the data storage portion 214. As shown in FIG. 10, the roll-causing-force reduction gain a is changed depending upon the vehicle speed v and is determined such that the roll-causing-force-reduction-type roll restraining force $F_R$ is made comparatively small. In this regard, the roll-causing-force reduction gain α is set at a value which prevents the front-wheel-side roll restraining force $F_{Rf}$ from being generated where the vehicle speed is not higher than the threshold speed $v_0$. In this instance, the restraining-force selecting portion 218 prevents the skyhook-type roll restraining force $F_S$ from being included in the target road-surface-unevenness-dependent-roll restraining force $F_U$, as explained above. Accordingly, where the vehicle speed v is not higher than the threshold speed $v_0$, the roll-causing-force-reduction-type roll restraining force $F_R$ that is specialized for the rear-wheel side is determined as the target road-surface-unevenness-dependent-roll restraining force $F_U$.

Figure 15:
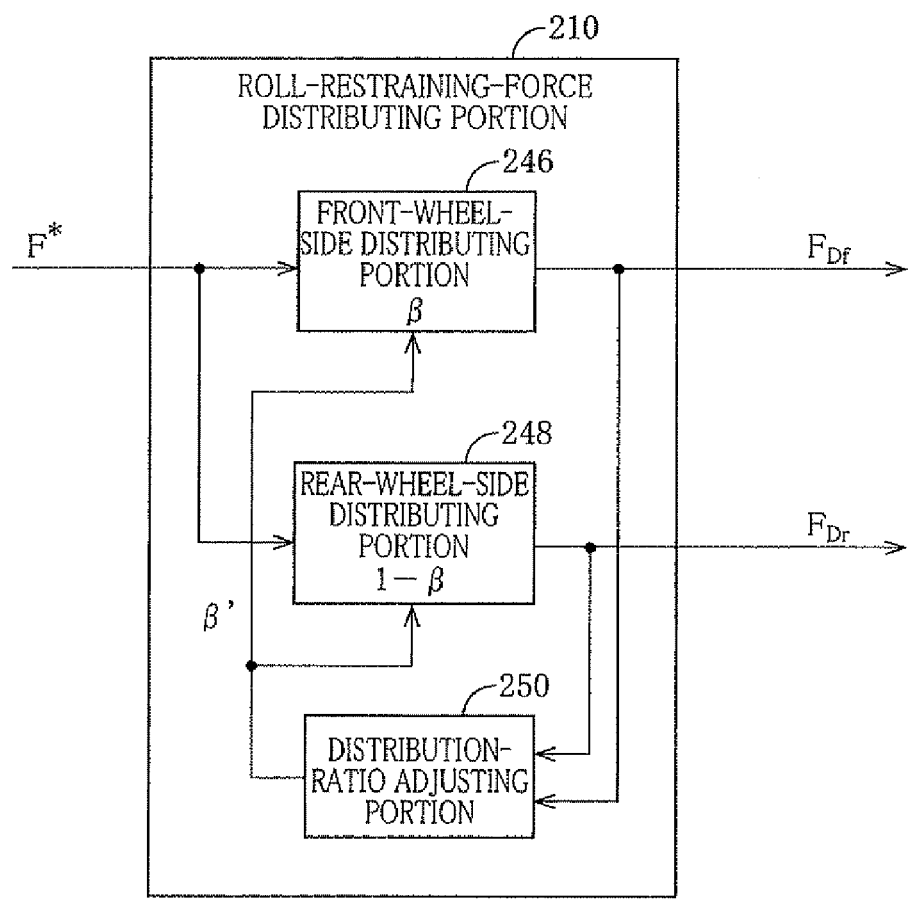
FIG. 15 a block diagram for explaining functions of a roll-restraining-force distributing portion of the controller of FIG. 11.

The above-described roll-restraining-force distributing portion 210 is configured as shown in FIG. 15. The roll-restraining-force distributing portion 210 includes a front-wheel-side distributing portion 246 and a rear-wheel-side distributing portion 248 which distribute, on the basis of the predetermined roll-stiffness distribution coefficient β, the target roll restraining force F* into the target front-wheel-side device-individualized roll restraining force $F_{Df}$ and the target rear-wheel-side device-individualized roll restraining force $F_{Dr}$. A distribution-ratio adjusting portion 250 has a function of preventing both of the distributed target front-wheel-side device-individualized roll restraining force $F_{Df}$ and target rear-wheel-side device-individualized roll restraining force $F_{Dr}$ from exceeding the threshold roll restraining force $F_{MAX}$. More specifically, where any of the forces $F_{Df}$ and $F_{Dr}$ exceed the threshold roll restraining force $F_{MAX}$, the distribution-ratio adjusting portion 250 sets the adjusted roll-stiffness distribution coefficient β' as a new coefficient. The front-wheel-side distributing portion 246 and the rear-wheel-side distributing portion 248 again distribute the target roll restraining force F* using the new coefficient β'. In other words, the roll-restraining-force distributing portion 210 has a function of preventing the load on the stabilizer devices 14 from becoming excessive, by changing the roll-stiffness distribution.

The invention claimed is:

1. A body-roll restraining system for restraining roll of a body of a vehicle equipped with front-wheel-side suspension devices respectively provided for left and right wheels on a front side of the vehicle and rear-wheel-side suspension devices respectively provided for left and right wheels on a rear side of the vehicle, each of the suspension devices including (a) a suspension spring for elastically connecting a sprung portion and an unsprung portion and (b) a damper for generating a damping force with respect to a relative movement of the sprung portion and the unsprung portion, the system comprising:

a front-wheel-side roll restraining device and a rear-wheel-side roll restraining device each of which is configured to generate a roll restraining force that functions as a force by which the sprung portion and the unspring portion corresponding to one of the left and right wheels approach toward each other while the sprung portion and the unspring portion corresponding to the other of the left and right wheels are separated away from each other, each of which has an actuator, and each of which is configured such that the roll restraining force is changeable owing to an operation of the actuator; and a controller which is configured to determine a target device-individualized roll restraining force that is the roll restraining force to be generated by each of the front-wheel-side roll restraining device and the rear-wheel-side roll restraining device and which is configured to control the operation of the actuator of said each of the front-wheel-side roll restraining device and the rear-wheel-side roll restraining device on the basis of the determined target device-individualized roll restraining force, wherein the controller includes a road-surface-unevenness-dependent-roll-restraining-force determining portion configured to determine a target road-surface-unevenness-dependent-roll restraining force that is the roll restraining force to be generated by both of the front-wheel-side roll restraining device and the rear-wheel-side roll restraining device, for restraining the roll of the body of the vehicle that arises from unevenness of a road surface on which the vehicle travels, wherein the road-surface-unevenness-dependent-roll-restraining-force determining portion is configured to determine the target road-surface-unevenness-dependent-roll restraining force according to a virtual roll behavior model set for restraining the roll of the body of the vehicle that arises from the unevenness of the road surface on which the vehicle travels, wherein the road-surface-unevenness-dependent-roll-restraining-force determining portion includes a roll-causing-force-reduction-type roll-restraining-force determining portion which employs a roll-causing-force reduction model as the roll behavior model for reducing a roll-causing force as a force to be generated by the suspension spring and the damper of each of the suspension devices and as a force that causes the roll of the body of the vehicle resulting from a relative displacement movement of the unsprung portions for the left and right wheels on the front side of the vehicle and a relative displacement movement of the unsprung portions for the left and right wheels on the rear side of the vehicle, the roll-causing-force-reduction-type roll-restraining-force determining portion configured to estimate, according to the roll-causing-force reduction model, a reduction force that is a difference between the roll-causing force to be actually generated by the suspension spring and the damper and the reduced roll-causing force and configured to determine the target road-surface-unevenness-dependent-roll restraining force on the basis of the estimation, wherein the roll-causing force contains components thereof: a front-wheel-side-spring-dependent roll-causing force generated by front-wheel-side springs that are the two suspension springs of the front-wheel-side suspension devices; a front-wheel-side-damper-dependent roll-causing force generated by front-wheel-side dampers that are the two dampers of the front-wheel-side suspension devices; a rear-wheel-side-spring-dependent roll-causing force generated by rear-wheel-side springs that are the two suspension springs of the rear-wheel-side suspension devices; and a rear-wheel-side-damper-dependent roll-causing force generated by rear-wheel-side dampers that are the two dampers of the rear-wheel-side suspension devices, and wherein the roll-causing-force reduction model is set so as to reduce at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force, on the basis of a reduction ratio set for each of the at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force.

2. The body-roll restraining system according to claim 1, wherein the roll-causing-force reduction model is set such that the front-wheel-side-spring-dependent roll-causing force coincides with a force whose magnitude depends on a front-wheel-side roll spring constant decided by spring constants of the respective front-wheel-side springs while the rear-wheel-side-spring-dependent roll-causing force coincides with a force whose magnitude depends on a rear-wheel-side roll spring constant decided by spring constants of the respective rear-wheel-side springs and such that the front-wheel-side-damper-dependent roll-causing force coincides with a force whose magnitude depends on a front-wheel-side roll damping coefficient decided by damping coefficients of the respective front-wheel-side dampers while the rear-wheel-side-damper-dependent roll-causing force coincides with a force whose magnitude depends on a rear-wheel-side roll damping coefficient decided by damping coefficients of the respective rear-wheel-side dampers, and wherein the roll-causing-force reduction model is set such that at least one of the front-wheel-side roll spring constant, the rear-wheel-side roll spring constant, the front-wheel-side roll damping coefficient, and the rear-wheel-side roll damping coefficient is reduced on the basis of the reduction ratio set for each of the at least one of the front-wheel-side-spring-dependent roll-causing force, the rear-wheel-side-spring-dependent roll-causing force, the front-wheel-side-damper-dependent roll-causing force, and the rear-wheel-side-damper-dependent roll-causing force that correspond to the front-wheel-side roll spring constant, the rear-wheel-side roll spring constant, the front-wheel-side roll damping coefficient, and the rear-wheel-side roll damping coefficient, respectively.

3. The body-roll restraining system according to claim 2, wherein the roll-causing-force reduction model includes at least one of a roll restraining spring configured to cause a force for restraining the roll of the body of the vehicle to act on the body of the vehicle according to an amount of the roll of the body of the vehicle and a roll restraining damper configured to cause the force according to a speed of the roll of the body of the vehicle, and wherein, where at least one of the front-wheel-side roll spring constant and the rear-wheel-side roll spring constant is reduced, the roll-causing-force reduction model at least includes the roll restraining spring having a roll spring constant that corresponds to an amount of reduction of the at least one of the front-wheel-side roll spring constant and the rear-wheel-side roll spring constant while, where at least one of the front-wheel-side roll damping coefficient and the rear-wheel-side roll damping coefficient is reduced, the roll-causing-force reduction model at least includes the roll restraining damper having a roll damping coefficient that corresponds to an amount of reduction of the at least one of the front-wheel-side roll damping coefficient and the rear-wheel-side roll damping coefficient.

4. The body-roll restraining system according to claim 1, wherein the roll-causing-force-reduction-type roll-restraining-force determining portion is configured to change, on the basis of a running speed of the vehicle, any of at least one reduction ratio each of which is set for each of the at least one of the front-wheel-side-spring-dependent roll-causing force, the front-wheel-side-damper-dependent roll-causing force, the rear-wheel-side-spring-dependent roll-causing force, and the rear-wheel-side-damper-dependent roll-causing force.

5. The body-roll restraining system according to claim 4, wherein the roll-causing-force-reduction-type roll-restraining-force determining portion is configured to determine the reduction ratios respectively set for the front-wheel-side-spring-dependent roll-causing force and the front-wheel-side-damper-dependent roll-causing force so as to be equal to 0 and to determine the reduction ratios respectively set for the rear-wheel-side-spring-dependent roll-causing force and the rear-wheel-side-damper-dependent roll-causing force so as to be equal to 1, where the running speed of the vehicle is not higher than a prescribed threshold speed.

6. The body-roll restraining system according to claim 4, wherein the roll-causing force-reduction-type roll-restraining-force determining portion is configured to conduct at least one of: (A) determining the reduction ratio set for the front-wheel-side-spring-dependent roll-causing force so as to be a value that is larger in a situation in which the running speed of the vehicle is high than in a situation in which the running speed of the vehicle is low; (B) determining the reduction ratio set for the front-wheel-side-damper-dependent roll-causing force so as to be a value that is smaller in a situation in which the running speed of the vehicle is high than in a situation in which the running speed of the vehicle is low; (C) determining the reduction ratio set for the rear-wheel-side-spring-dependent roll-causing force so as to be a value that is smaller in a situation in which the running speed of the vehicle is high than in a situation in which the running speed of the vehicle is low; and (D) determining the reduction ratio set for the rear-wheel-side-damper-dependent roll-causing force so as to be a value that is larger in a situation in which the running speed of the vehicle is high than in a situation in which the running speed of the vehicle is low, where the running speed of the vehicle is not lower than a prescribed threshold speed.

7. The body-roll restraining system according to claim 1, wherein the roll-causing-force-reduction-type roll-restraining-force determining portion is configured to estimate, according to the roll-causing-force reduction model, at least one of the relative displacement movement of the unsprung portions for the left and right wheels on the front side of the vehicle and the relative displacement movement of the unsprung portions for the left and right wheels on the rear side of the vehicle and to estimate the reduction force based on the estimation of the at least one of the relative displacement movements.

8. The body-roll restraining system according to claim 7, wherein the roll-causing-force-reduction-type roll-restraining-force determining portion is configured to estimate the at least one of the relative displacement movement of the unsprung portions for the left and right wheels on the front side of the vehicle and the relative displacement movement of the unsprung portions for the left and right wheels on the rear side of the vehicle, on the basis of at least one of: (i) at least one of: (i-1) a front-wheel-side relative stroke movement that is a relative change in distances between the sprung portion and the unsprung portion for the left wheel on the front-side of the vehicle and between the sprung portion and the unsprung portion for the right wheel on the front-side of the vehicle; and (i-2) a rear-wheel-side relative stroke movement that is a relative change in distances between the sprung portion and the unsprung portion for the left wheel on the rear-side of the vehicle and between the sprung portion and the unsprung portion for the right wheel on the rear-side of the vehicle: and (ii) a roll movement of the body of the vehicle.

9. The body-roll restraining system according to claim 8, wherein the roll-causing-force-reduction-type roll-restraining-force determining portion is configured to selectively conduct one of: the estimation based on the at least one of the front-wheel-side relative stroke movement and the rear-wheel-side relative stroke movement; and the estimation based on the roll movement of the body of the vehicle, and wherein the roll-causing-force-reduction-type roll-restraining-force determining portion is configured to conduct the estimation based on the at least one of the front-wheel-side relative stroke movement and the rear-wheel-side relative stroke movement where a running speed of the vehicle is higher than a prescribed threshold speed and to conduct the estimation based on the roll movement of the body of the vehicle where the running speed of the vehicle is lower than the prescribed threshold speed.

10. The body-roll restraining system according to claim 8, wherein the roll-causing-force-reduction-type roll-restraining-force determining portion has at least one of:
a configuration in which is estimated the at least one of the relative displacement movement of the unsprung portions for the left and right wheels on the front side of the vehicle and the relative displacement movement of the unsprung portions for the left and right wheels on the rear side of the vehicle, on the basis of: the front-wheel-side relative stroke movement based on measured distances between the sprung portion and the unsprung portion for the left wheel on the front-side of the vehicle and between the sprung portion and the unsprung portion for the right wheels on the front-side of the vehicle; and the rear-wheel-side relative stroke movement estimated on the basis of the measured distances, a running speed of the vehicle, and a wheelbase of the vehicle, where the roll-causing-force-reduction-type roll-restraining-force determining portion conducts the estimation based on the at least one of the front-wheel-side relative stroke movement and the rear-wheel-side relative stroke movement; and a configuration in which is estimated the at least one of the relative displacement movement of the unsprung portions for the left and right wheels on the front side of the vehicle and the relative displacement movement of the unsprung portions for the left and right wheels on the rear side of the vehicle, on the basis of: the roll movement of the body of the vehicle based on a measured amount of the roll of the body of the vehicle; a running speed of the vehicle; and a wheelbase of the vehicle, where the roll-causing-force-reduction-type roll-restraining-force determining portion conducts the estimation based on the roll movement of the body of the vehicle.

11. The body-roll restraining system according to claim 1, wherein the controller further includes a roll-restraining-force distributing portion configured to distribute the target road-surface-unevenness-dependent-roll restraining force determined by the road-surface-unevenness-dependent-roll-restraining-force determining portion into the target device-individualized roll restraining force for the front-wheel-side roll restraining device and the target device-individualized roll restraining force for the rear-wheel-side roll restraining device, on the basis of a distribution ratio.

12. The body-roll restraining system according to claim 1, wherein the controller further includes a vehicle-turning-dependent-roll-restraining-force determining portion configured to determine a target vehicle-turning-dependent-roll restraining force that is the roll restraining force to be generated by both of the front-wheel-side roll restraining device and the rear-wheel-side roll restraining device, for restraining the roll of the body of the vehicle that arises from turning of the vehicle.

13. The body-roll restraining system according to claim 12, wherein the controller further includes a roll-restraining-force distributing portion configured to distribute a total force of the target road-surface-unevenness-dependent-roll restraining force determined by the road-surface-unevenness-dependent-roll-restraining-force determining portion and the target vehicle-turning-dependent-roll restraining force determined by the vehicle-turning-dependent-roll-restraining-force determining portion, into the target device-individualized roll restraining force for the front-wheel-side roll restraining device and the target device-individualized roll restraining force for the rear-wheel-side roll restraining device, on the basis of the distribution ratio.

14. The body-roll restraining system according to claim 12, wherein the vehicle-turning-dependent-roll-restraining-force determining portion is configured to determine the target vehicle-turning-dependent-roll restraining force on the basis of a value of a vehicle-turning-dependent roll-moment index indicative of roll moment that acts on the body of the vehicle arising from the turning of the vehicle.

* * * * *